United States Patent
Baek et al.

(10) Patent No.: US 10,104,208 B2
(45) Date of Patent: Oct. 16, 2018

(54) MOBILE TERMINAL AND CONTROLLING METHOD THEREOF

(71) Applicant: LG ELECTRONICS INC., Seoul (KR)

(72) Inventors: Bumhyeon Baek, Seoul (KR); Hyukjoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 15/218,046

(22) Filed: Jul. 24, 2016

(65) Prior Publication Data

US 2017/0187852 A1     Jun. 29, 2017

(30) Foreign Application Priority Data

Dec. 29, 2015 (KR) ......................... 10-2015-0188724

(51) Int. Cl.
*G10L 17/22* (2013.01)
*H04M 1/02* (2006.01)
(Continued)

(52) U.S. Cl.
CPC ........ *H04M 1/0264* (2013.01); *G06K 9/4604* (2013.01); *G10L 17/22* (2013.01);
(Continued)

(58) Field of Classification Search
None
See application file for complete search history.

(56) References Cited

U.S. PATENT DOCUMENTS

2011/0098029 A1* 4/2011 Rhoads .............. G01C 21/3629
                                                                455/418
2011/0098056 A1* 4/2011 Rhoads .................. G01C 21/20
                                                                455/456.1

(Continued)

FOREIGN PATENT DOCUMENTS

KR        20110049328          5/2011
KR       1020120028491         3/2012
(Continued)

OTHER PUBLICATIONS

Korean Intellectual Property Office Application No. 10-2015-0188724, Notice of Allowance dated Apr. 21, 2017, 1 page.

(Continued)

*Primary Examiner* — David Bilodeau
(74) *Attorney, Agent, or Firm* — Lee, Hong, Degerman, Kang & Waimey

(57) ABSTRACT

Disclosed are a mobile terminal for providing an intelligent agent (IA) service and controlling method thereof. The mobile terminal includes a display unit, a camera, a sensing unit comprising a microphone configured to sense a surrounding voice of the mobile terminal, an angle sensor configured sense an angle of the mobile terminal, and a location sensor configured to sense a location of the mobile terminal, a communication unit configured to transmit/receive data with a server configured to store a context information of a user, and a controller, if a trigger signal including a preset voice signal is sensed through the microphone, activating an intelligent agent (IA), the controller, if a preset input signal is sensed in a state that the IA is activated, activating the camera.

19 Claims, 29 Drawing Sheets

(51) Int. Cl.
| | |
|---|---|
| *H04W 4/02* | (2018.01) |
| *H04M 1/60* | (2006.01) |
| *H04M 1/03* | (2006.01) |
| *H04M 1/725* | (2006.01) |
| *G06K 9/46* | (2006.01) |
| *H04N 5/232* | (2006.01) |

(52) U.S. Cl.
CPC ............... *H04M 1/03* (2013.01); *H04M 1/60* (2013.01); *H04M 1/72527* (2013.01); *H04N 5/23293* (2013.01); *H04W 4/02* (2013.01)

(56) References Cited

U.S. PATENT DOCUMENTS

| | | | |
|---|---|---|---|
| 2012/0062766 A1 | 3/2012 | Park | |
| 2013/0225236 A1 | 8/2013 | Lee et al. | |
| 2014/0063313 A1* | 3/2014 | Choi | H04N 5/23216 348/333.02 |
| 2014/0253743 A1* | 9/2014 | Loxam | H04N 5/232 348/207.1 |
| 2014/0258182 A1 | 9/2014 | Joung et al. | |
| 2015/0004958 A1* | 1/2015 | Wang | H04W 4/02 455/418 |
| 2016/0337580 A1* | 11/2016 | Kwon | G06F 3/14 |
| 2017/0099432 A1* | 4/2017 | DeLuca | H04N 5/23219 |
| 2017/0126954 A1* | 5/2017 | Bekiares | H04N 5/23206 |

FOREIGN PATENT DOCUMENTS

| | | |
|---|---|---|
| KR | 10-2014-0056321 | 5/2014 |
| KR | 1020140109719 | 9/2014 |
| KR | 1020150059344 | 6/2015 |

OTHER PUBLICATIONS

PCT International Application No. PCT/KR2016/007553, Notification of Transmittal of the International Search Report and the Written Opinion of the International Searching Authority, or the Declaration, with ISR and Written Opinion dated Oct. 27, 2016, 12 pages.

* cited by examiner

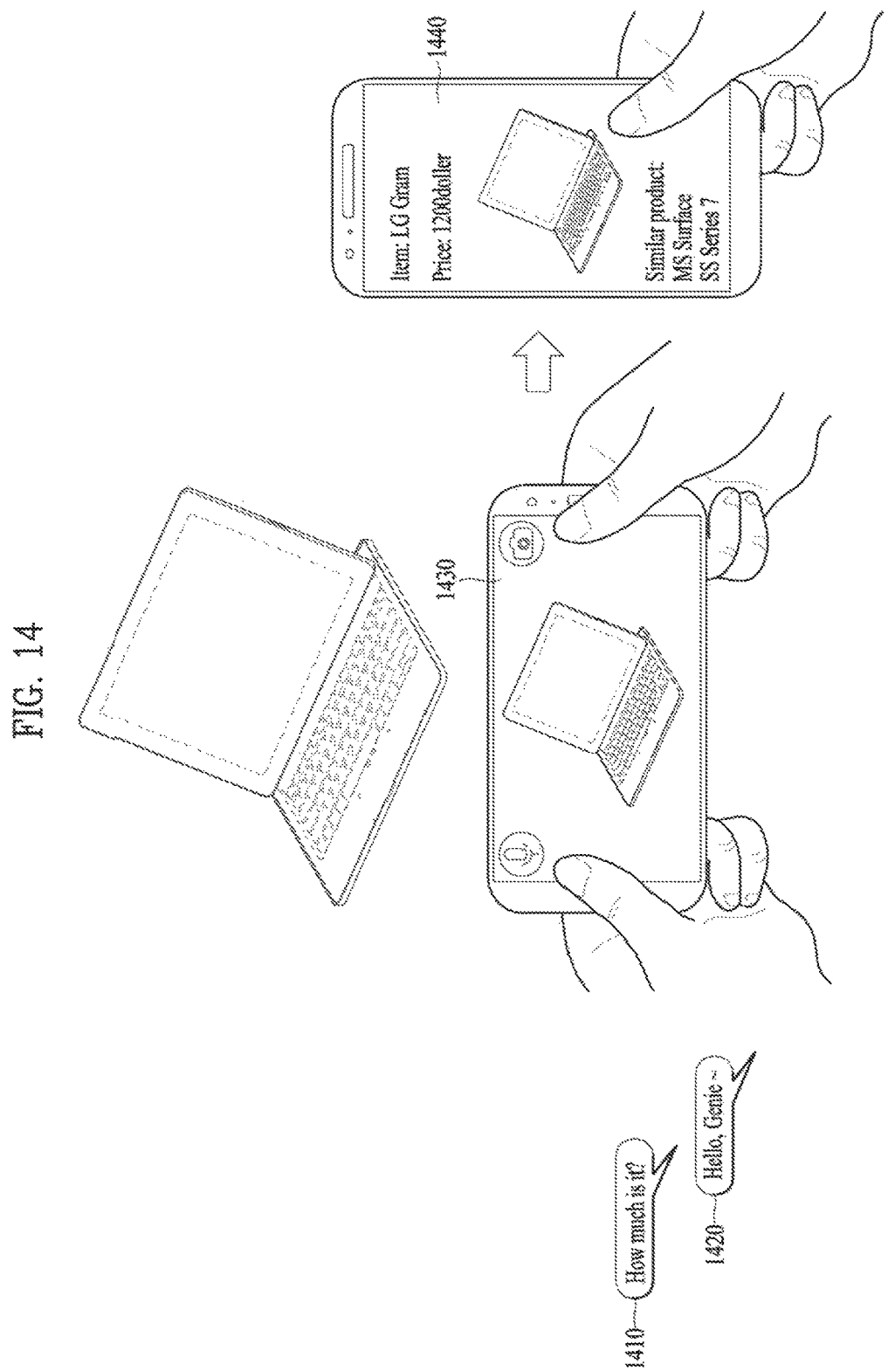

MOBILE TERMINAL AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Application No. 10-2015-0188724, filed on Dec. 29, 2015, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for providing an intelligent agent (IA) service based on at least one image input.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, owing to the recent technological developments, an intelligent agent (hereinafter abbreviated IA) is used actively and popularly. The intelligent agent may correspond to the software configured to make a determination on behalf of a user with a predetermined level of autonomy or independency. Although various IA services are currently provided in a mobile terminal using user's voice signal, the demand for a method of providing an IA service using various signals sensed from a user as well as a voice signal may rise.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which an IA service can be provided based on a sensed signal in a state that an intelligent agent and a camera are currently active.

Another object of the present invention is to provide a mobile terminal and controlling method thereof, by which an IA service can be provided based on an image sensed from a camera, a captured image and a screen shot image as well as a voice input in a state that an intelligent agent and a camera are currently active.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit, a camera, a sensing unit including a microphone configured to sense a surrounding voice of the mobile terminal, an angle sensor configured sense an angle of the mobile terminal, and a location sensor configured to sense a location of the mobile terminal, a communication unit configured to transmit/receive data with a server configured to store a context information of a user, and a controller, if a trigger signal including a preset voice signal is sensed through the microphone, activating an intelligent agent (IA), the controller, if a preset input signal is sensed in a state that the IA is activated, activating the camera.

Preferably, the controller may extract image context information corresponding to an image sensed within a view angle area of the camera.

More preferably, the controller may extract voice context information corresponding to a voice sensed within a preset time before and after a timing point of sensing the trigger signal in a state that the microphone is activated and the controller may further provide an IA information based on the image context information and the voice context information.

More preferably, the controller may extract location context information from a location information of the mobile terminal and may provide an IA information based on the image context information and the location context information.

More preferably, the image context information may correspond to at least two preview images sensed within the view angle area of the camera and the at least two preview images may include a $1^{st}$ preview image and a $2^{nd}$ preview image.

In this case, the controller may sense the $2^{nd}$ preview image within a preset time after sensing the $1^{st}$ preview image. In doing so, if a preset time expires after sensing the $2^{nd}$ preview image, the controller may provide IA information based on the $1^{st}$ preview image and the $2^{nd}$ preview image.

And, the controller may extract location context information from location information of the mobile terminal and may provide the IA information based on the location context information, the $1^{st}$ preview image and the $2^{nd}$ preview image.

More preferably, the image context information may correspond to at least two capture images sensed within the view angle area of the camera and the at least two capture images may include a $1^{st}$ capture image and a $2^{nd}$ capture image.

In this case, the controller may extract location context information from a location information of the mobile terminal and may provide an IA information based on the location context information, the 1$^{st}$ capture image and the 2$^{nd}$ capture image.

Preferably, while the IA is activated, the controller may extract image context information corresponding to at least one screen shot image for a content outputted to the display unit and may provide an IA information based on the image context information.

More preferably, if an IA of an external device having the user authenticated therefor is activated, the controller may transmit the IA information to the server.

More preferably, the image context information may include at least one capture image having an input signal sensed for a preview image sensed within the view angle area of the camera and at least one screen shot image for a content outputted to the display unit.

In this case, the controller may receive an additional context information of the user sensed by the external device through the communication unit and may provide an IA information based on the received additional context information and the image context information.

More preferably, the IA information may be provided in form of visual information or voice information.

More preferably, the IA information may include tag information indicating a keyword of the context information.

Preferably, if the IA is activated, the controller may launch an IA related application. In doing so, if the camera is activated, the controller may output a preview image sensed in a view angle area of the camera to the IA related application.

In another aspect of the present invention, as embodied and broadly described herein, a method of controlling a mobile terminal according to another embodiment of the present invention may include the steps of sensing a trigger signal including a preset voice signal through a microphone, activating an intelligent agent (IA), sensing a preset input signal in a state that the IA is activated, and activating a camera.

In another aspect of the present invention, as embodied and broadly described herein, a mobile terminal, comprising: a display, a camera, a sensing unit comprising a microphone, a communication unit configured to communicate with a server, and a controller configured to activate an intelligent agent (IA) in response to a trigger signal, the trigger signal comprising a preset voice signal received via the microphone, and activate the camera in response to a preset input signal sensed in a state that the IA has been activated.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 14 is a diagram for one example of providing an IA service through a voice input and an image input in a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
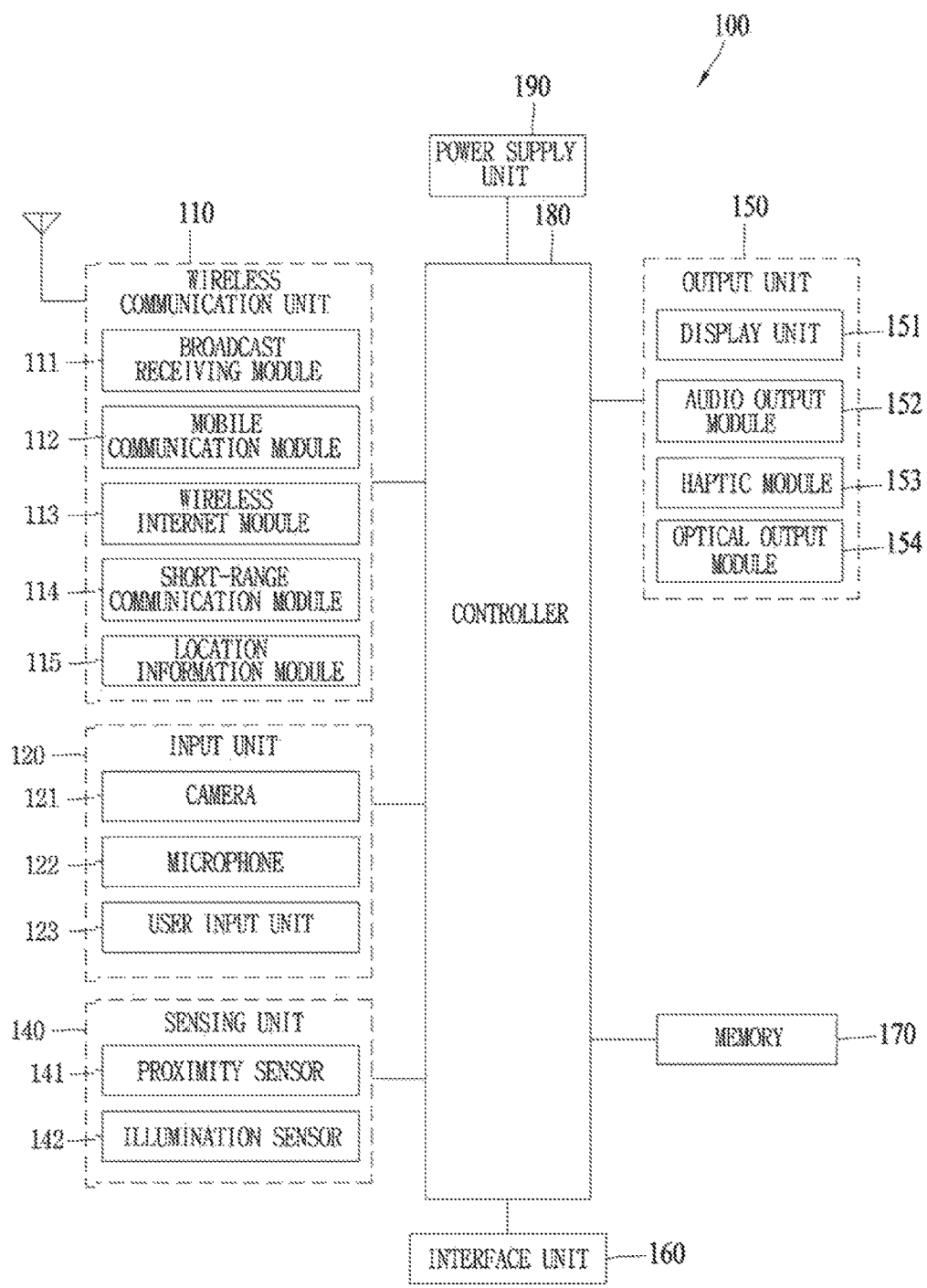
FIG. 1A is a block diagram of a mobile terminal in accordance with the present disclosure.
Figure 1B:
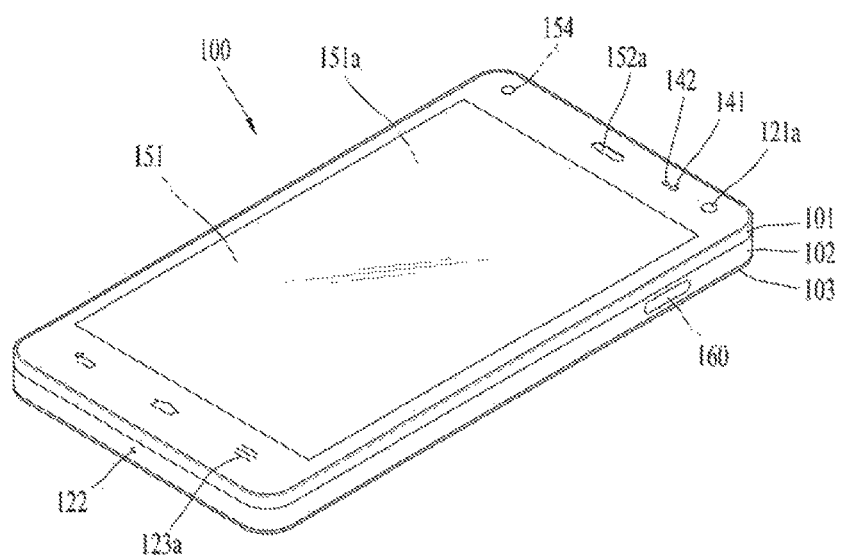
FIGS. 1B and 1C are conceptual views of one example of the mobile terminal, viewed from different directions.
Figure 1C:
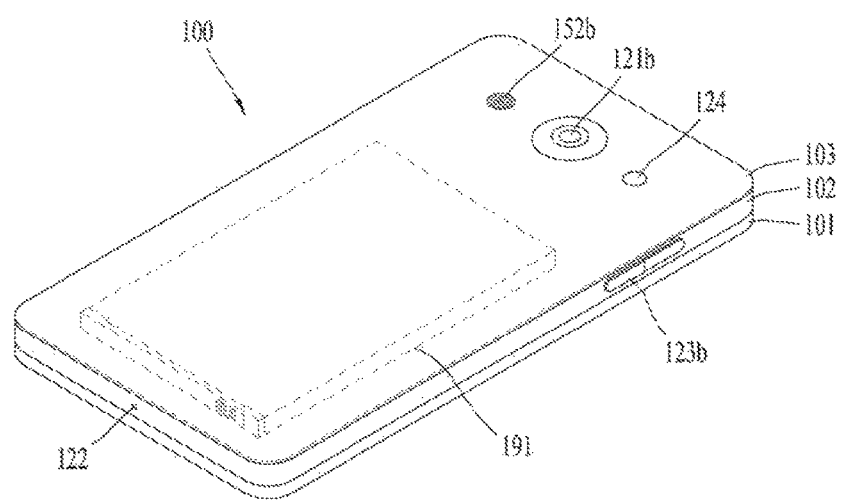

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and information inputted or outputted through the components mentioned in the foregoing description or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the $1^{st}$ audio output unit 152a, the $2^{nd}$ audio output unit 152b, the proximity sensor 141, the illumination sensor 142, the optical output unit 154, the $1^{st}$ camera 121a, the $2^{nd}$ camera 121b, the 1st manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera 121a. If desired, the second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed in a mobile terminal using a flexible display. This shall be described in detail with reference to the accompanying drawings as follows.

Figure 2:
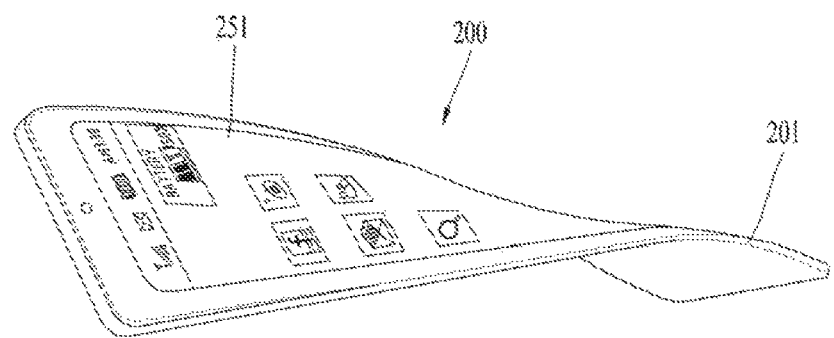
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
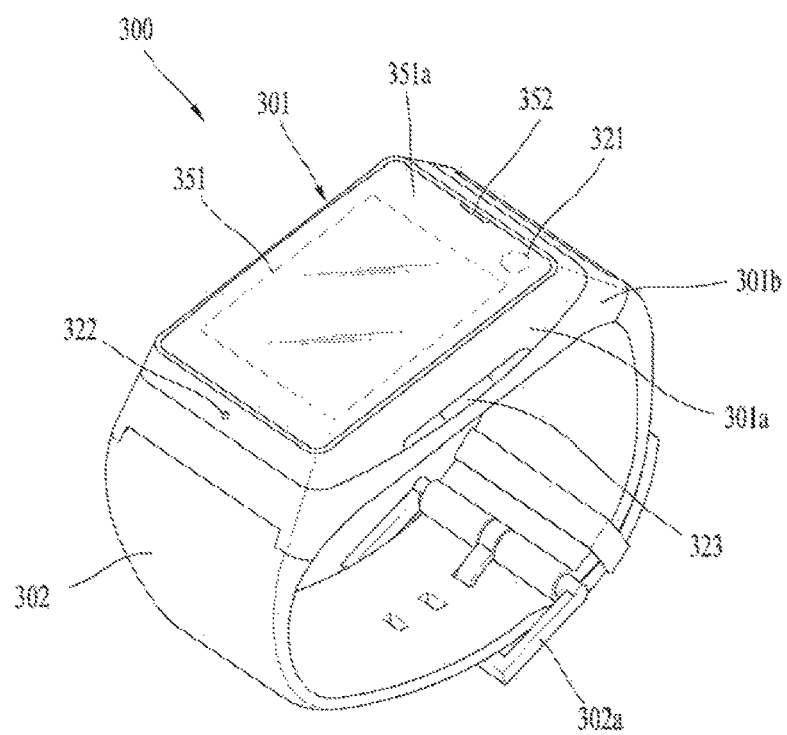
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
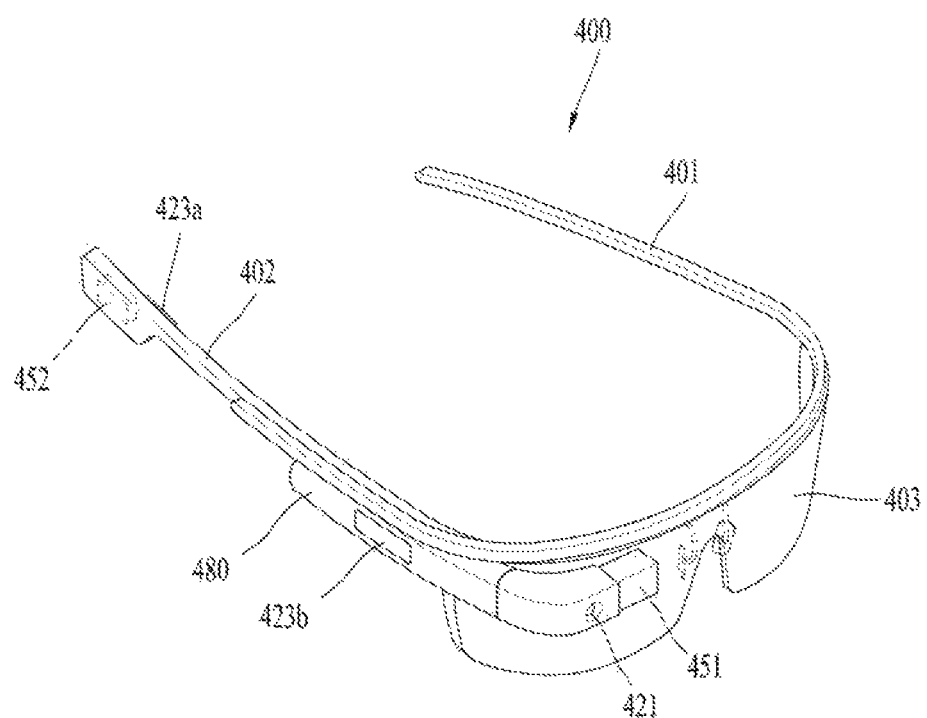
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following description, FIGS. 5 to 28 show methods of providing IA information to a user using an intelligent agent on a mobile terminal.

Figure 5:
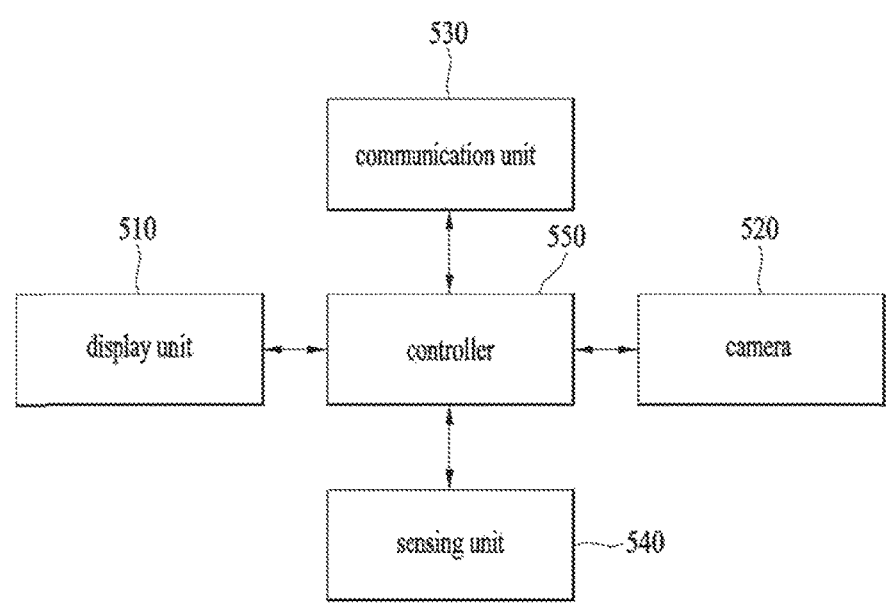
FIG. 5 is a block diagram of a mobile terminal according to one embodiment of the present invention.

First of all, FIG. 5 is a block diagram of a mobile terminal according to one embodiment of the present invention.

Referring to FIG. 5, a mobile terminal according to one embodiment of the present invention may include a display unit 510, a camera 520, a communication unit 530, a sensing unit 540, and a controller 550. Moreover, the configuration modules included in the mobile terminal of the present invention are non-limited by the above-listed components.

The display unit 510 can display visual information. In this case, the visual information may include at least one of a content, an application, an image, a video and the like. Moreover, based on a control command of the controller 550, the display unit 510 can output the visual information to a screen. According to the present invention, the display unit 510 may be embodied with the display 151 shown in FIG. 1A. According to the present invention, the display unit 510 can output an image sensed by the camera 520. Moreover, the display unit 510 can output IA information.

The camera 520 can photograph an image sensed within a view angle area. According to the present invention, the camera 520 may be embodied with the camera 121 shown in FIG. 1A. According to the present invention, the camera 520 can sense an object located in front. Moreover, according to the present invention, the camera 520 in a deactivated state can be activated in response to a preset input signal.

The communication unit 530 performs a communication with an external device using various protocols and is able to transmit/receive data. And, the communication unit 530 accesses a network by wire or wireless and is then able to transmit/receive digital data of contents and the like. According to the present invention, the communication unit 530 may be embodied with the wireless communication unit 140 shown in FIG. 1A. According to the present invention, the communication unit 530 can transmit context information sensed by the mobile terminal to a server and is also able to receive recommended service information from the server.

The sensing unit 540 senses user's various inputs and an environment of the mobile terminal and is then able to deliver the sensing result to enable the controller 550 to perform operations according to the delivered sensing result. According to the present invention, the sensing unit 540 may be embodied with a touchscreen provided to the display unit 510. According to the present invention, the sensing unit 540 may be embodied with the sensing unit 140 or the input unit 120 shown in FIG. 1A. According to the present invention, the sensing unit 540 may include at least one of a microphone, a touch sensor, an acceleration sensor, a gyroscope sensor, a GPS sensor, a geomagnetic sensor and the like. According to one embodiment, the sensing unit 540 can sense user's voice input or a voice input sensed from surroundings of the mobile terminal through the microphone. According to one embodiment, the sensing unit 540 can sense an angle of the mobile terminal, a posture of the mobile terminal and the like through the gyroscope sensor. According to one embodiment, the sensing unit 540 can sense location information of the mobile terminal through the GPS sensor, the gyroscope sensor, the geomagnetic sensor and the like.

The controller 550 processes data, controls the above-mentioned units of the mobile terminal, and is able to control data transmissions/receptions between the units. According to the present invention, the controller 550 may be embodied with the controller 180 shown in FIG. 1A.

According to the present invention, the controller 550 can activate an intelligent agent in response to a trigger signal sensed through the sensing unit 540. While an IA is activated, in case of sensing a preset input signal, the controller 550 can activate the camera 520. And, while the camera 520 is in the activated state, the controller 550 can extract image information from an image sensed by the camera 520.

According to one embodiment of the present invention, operations performed by the mobile terminal can be controlled by the controller 550. For clarity of the following descriptions with reference to the accompanying drawings, such operations are commonly depicted and described as performed/controlled by the mobile terminal.

Figure 6:
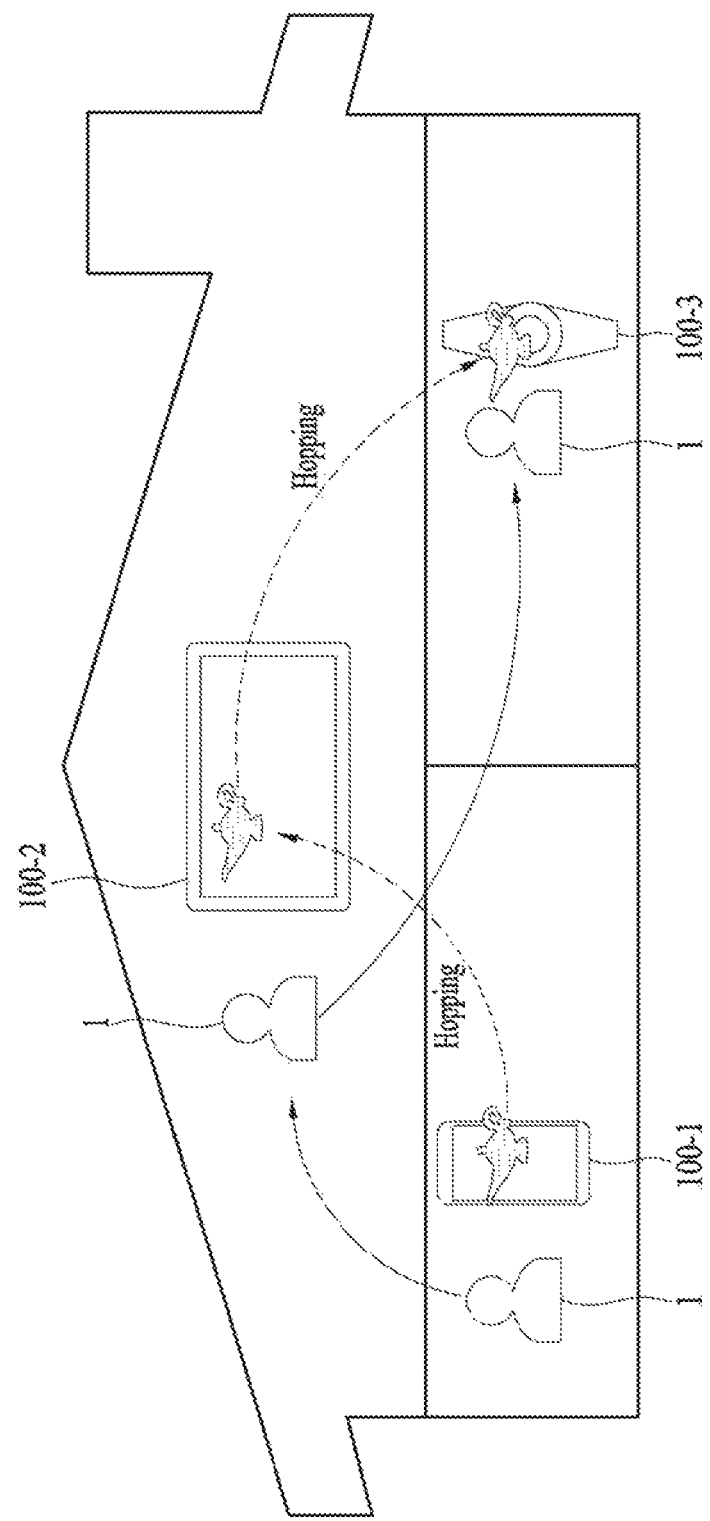
FIG. 6 is a diagram to describe an intelligent agent system according to one embodiment of the present invention.

FIG. 6 is a diagram to describe an intelligent agent system according to one embodiment of the present invention. Particularly, FIG. 6 shows an intelligent agent system including a plurality of devices equipped with intelligent agents.

Referring to FIG. 6, there exist a plurality of devices 100-1, 100-2 and 100-3. Although the devices 100-1, 100-2 and 100-3 shown in FIG. 6 are depicted as located in different spaces, respectively, a plurality of the devices 100-1, 100-2 and 100-3 may be located in the same space. And, a plurality of the devices 100-1, 100-2 and 100-3 may include intelligent agents (IAs), respectively.

Generally, a program or system configured to collect information periodically and perform a prescribed service without user's intervention in a dynamic environment is called an IA. In this case, the IA interacts with an external environment using a sensor. The external environment may mean an operating system, a network, or the like. The IA can have a knowledge base and a reasoning function. And, the IA can solve a problem through an information exchange and communication with a user, a resource, or another agent.

The IA can make self-determination and operate without direct or indirect interference with other things. The IA can control an operation or status. The IA can interact with a human or another agent using a communication language. The IA can respond to a change by recognizing such an environment as a system, Internet or the like and is able to operate with initiative. And, the IA can perform an operation consecutively in response to a similar input instead of an one-time operation.

In the present specification, each terminal may mean a device including an IA. And, the IA may exist as a single layer within the terminal. In some cases, a terminal itself may be called IA. The IA may respond to user's stimulation. The IA senses an information related to a user, transmits the information to a server (or cloud), and is able to receive information from the server. The IA can provide a user with an optimal service by combining the extracted or sensed information and the received information together.

According to the embodiment shown in FIG. 6, if a user 1 is a registered user of $1^{st}$ to $3^{rd}$ terminals 100-1 to 100-3, the user 1 can be provided with a same IA service through the $1^{st}$ to $3^{rd}$ terminals 100-1 to 100-3. For instance, the $1^{st}$ terminal 100-1 may correspond to a smartphone, the $2^{nd}$ terminal 100-2 may correspond to a tablet PC or a television, and the $3^{rd}$ terminal 100-3 may correspond to a smart watch.

The user 1 can use the $1^{st}$ terminal 100-1. In doing so, the intelligent agent (IA) of the $1^{st}$ terminal 100-1 can sense a use pattern of the user. For instance, the use pattern of the user may include one of a week day, a time, a used application, a used content, a use time and the like. The $1^{st}$ terminal device 100-1 can transmit the sensed information to a server. Subsequently, the server creates a user profile per user and is then able to save the received information to the created user profile.

The user 1 ends the use of the $1^{st}$ terminal 100-1 and is then able to use the $2^{nd}$ terminal 100-2. In order for the user 1 to use the $2^{nd}$ terminal 100-2, a user authentication process can be performed. For instance, the user authentication can be performed through at least one of a fingerprint recognition, a face recognition, a voice recognition, an input pattern an iris recognition, a voice recognition or password check procedure. If the user is recognized, the $2^{nd}$ terminal 100-2 makes a request for context information of the recognized user to the server and is then able to receive the context information. In this case, the context information may mean various kinds of currently sensed information and information including currently used applications, files, data, contents and the like.

The IA in the $2^{nd}$ terminal 100-2 can sense current context information. In consideration of the current context information, the received context information and the properties of the $2^{nd}$ terminal 100-2, the IA can recommend a service to the user 1. For instance, the IA may recommend a job currently performed in the $1^{st}$ terminal 100-1 or an application currently run in the $1^{st}$ terminal 100-1. The IA may recommend an optimal service in consideration of the received context information and the current context information. The user 1 can feel as if the IA of the $1^{st}$ terminal 100-1 moves to the $2^{nd}$ terminal 100-2 and provides a service. Subsequently, the $2^{nd}$ terminal 100-2 can transmit the sensed information to the server. Thereafter, the server can save the received information to the user profile per user.

Likewise, the user 1 ends the use of the $2^{nd}$ terminal 100-2 and is then able to use the $3^{rd}$ terminal 100-3. In particular, the user 1 can use the $3^{rd}$ terminal 10-3 through an authentication process. The $3^{rd}$ terminal 100-3 makes a request for context information of the recognized user to the server, receives the context information from the server, and is able to sense current context information. Subsequently, the $3^{rd}$ terminal 100-3 can recommend and provide a service to the user 1 in consideration of the received information, the sensed information and the properties of the terminal device. In the following description, a structure of a terminal device and a hierarchical structure between a server and the terminal device are explained.

Figure 7:
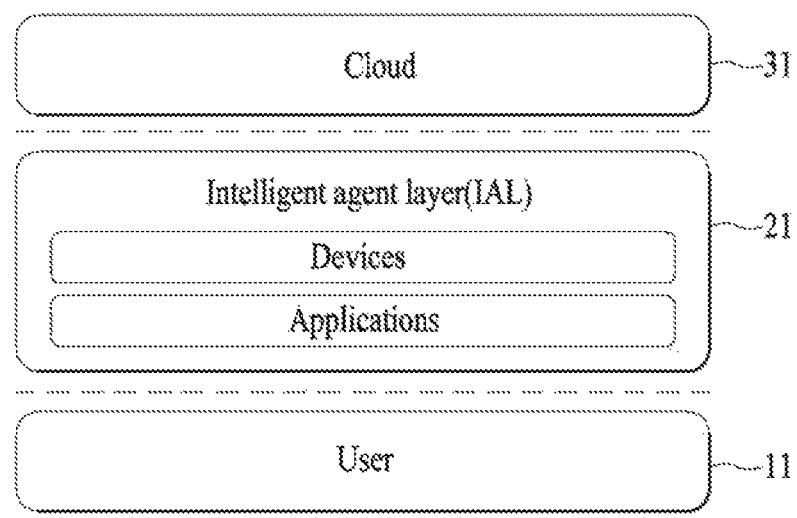
FIG. 7 is a diagram to hierarchically describe one embodiment of an intelligent agent system with reference to a single terminal.

FIG. 7 is a diagram to hierarchically describe one embodiment of an intelligent agent system with reference to a single terminal.

Referring to FIG. 7, an intelligent agent system may include an intelligent agent layer (IAL) 21 and a cloud 31. The intelligent agent system creates context information by sensing user's pattern and the like and is then able to provide a service using the created context information. A terminal device receives an input of user's command or senses user's action and the like. The intelligent agent layer 21 obtains information of an application launched in response to an inputted command and the like and is also able to obtain information related to the sensed action from the terminal device. The intelligent agent layer 21 can transmit the obtained information to the cloud 31.

If a user 11 is confirmed, the intelligent agent layer 21 can receive the information on the confirmed user 11 from the cloud 31. Based on the received information, the intelligent agent layer 21 may launch an appropriate application or output data to an external environment of the terminal device.

Figure 8:
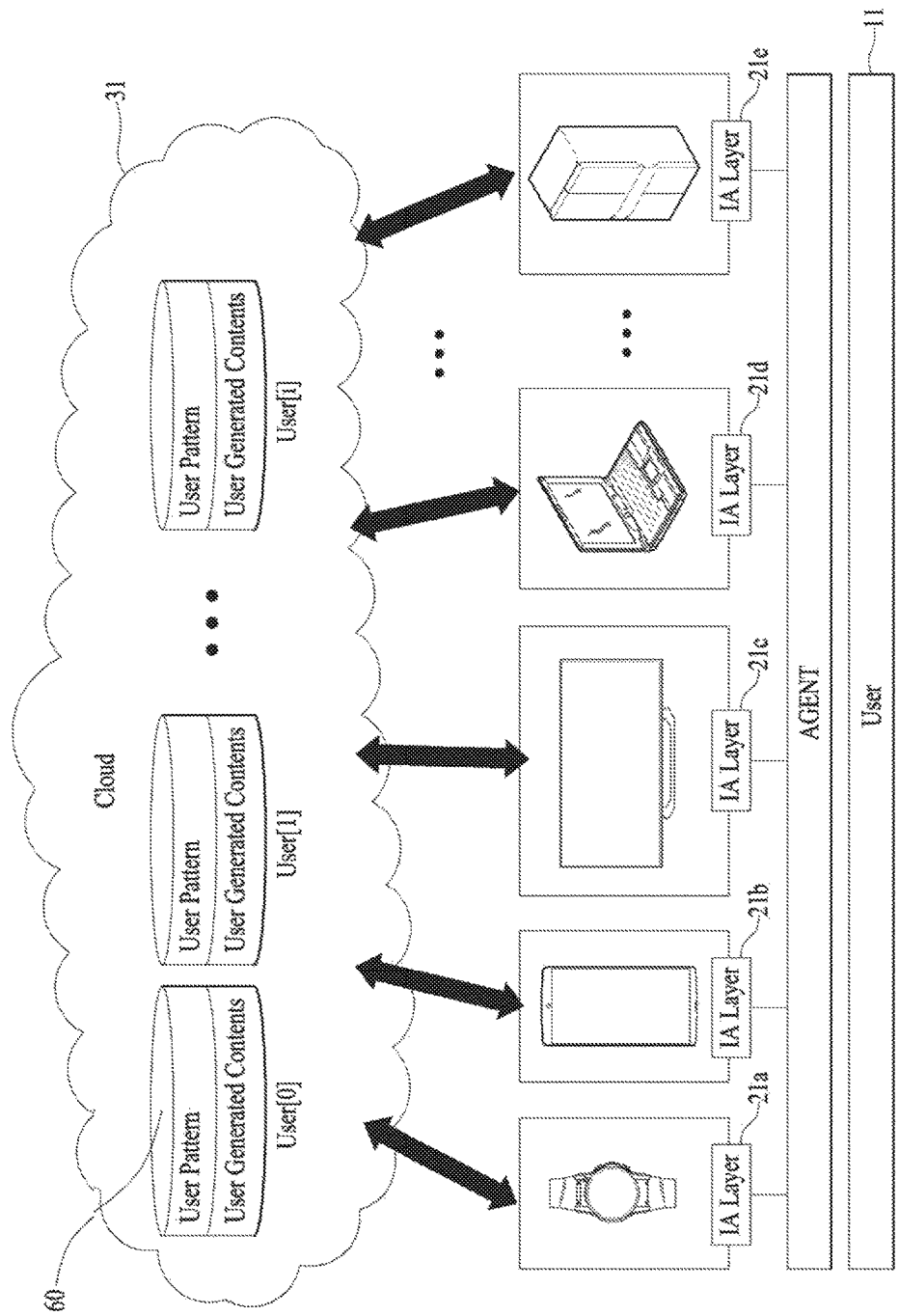
FIG. 8 is a diagram to hierarchically describe an intelligent agent system including a plurality of terminals according to one embodiment of the present invention.

FIG. 8 is a diagram to hierarchically describe an intelligent agent system including a plurality of terminals according to one embodiment of the present invention. In particular, in case that a single user owns a plurality of terminals, FIG. 8 shows a method for each user to be provided with a same IA service by each of the terminals.

Referring to FIG. 8, an intelligent agent system including a plurality of terminals is illustrated. In general, a user 11 can own a plurality of terminals. And, the user 11 can use a plurality of the terminals simultaneously or alternately. A plurality of the terminals can include intelligent agent layers 21a, 21b, 21c, 21d and 21e, respectively. And, a cloud 31 can create user profiles of a plurality of users and is able to store the created user files. For instance, a $0^{th}$ user and a $1^{st}$ user may belong to a family. The $0^{th}$ user may own a smart watch and a smartphone. The $1^{st}$ user may own a smartphone and a notebook. And, the $0^{th}$ user and the $1^{st}$ user may co-own a TV and a refrigerator. If an IAL 21 of the smart watch recognizes the $0^{th}$ user, the IAL 21a of the smart watch can send context information of the $0^{th}$ user to the cloud 31. In case that the $0^{th}$ user is watching a content using the TV, an IAL 21c of the TV recognizes the $0^{th}$ user using such a method as a face recognition and the like and is then able to send a context information of the $0^{th}$ user to the cloud 31. Likewise, if an IAL 21d of the notebook recognizes the $1^{st}$ user, the IAL 21d can send context information of the $1^{st}$ user to the cloud 31. In case that the $1^{st}$ user uses the refrigerator, an IAL 21e of the refrigerator can send a context information of the $1^{st}$ user to the cloud 31 using such a method as a fingerprint recognition and the like.

The cloud 31 can save the context information received from the respective terminal devices in a manner of sorting them by users. For instance, the cloud 31 creates a profile 60 of the $0^{th}$ user and is then able to save such information as a user pattern of the $0^{th}$ user, a use content of the $0^{th}$ user and the like to the profile 60. Likewise, the cloud 31 creates a profile of the $1^{st}$ user and is then able to save context information of the $1^{st}$ user to the created profile of the $1^{st}$ user.

If an IAL of a terminal device requests context information on a specific user, the cloud 31 can send corresponding content information. For instance, if the $0^{th}$ user uses the smartphone, an IAL 21b of the smartphone requests context information of the $0^{th}$ user, receives the corresponding context information, and is then able to provide a service to the $0^{th}$ user based on the received context information.

Figure 9:
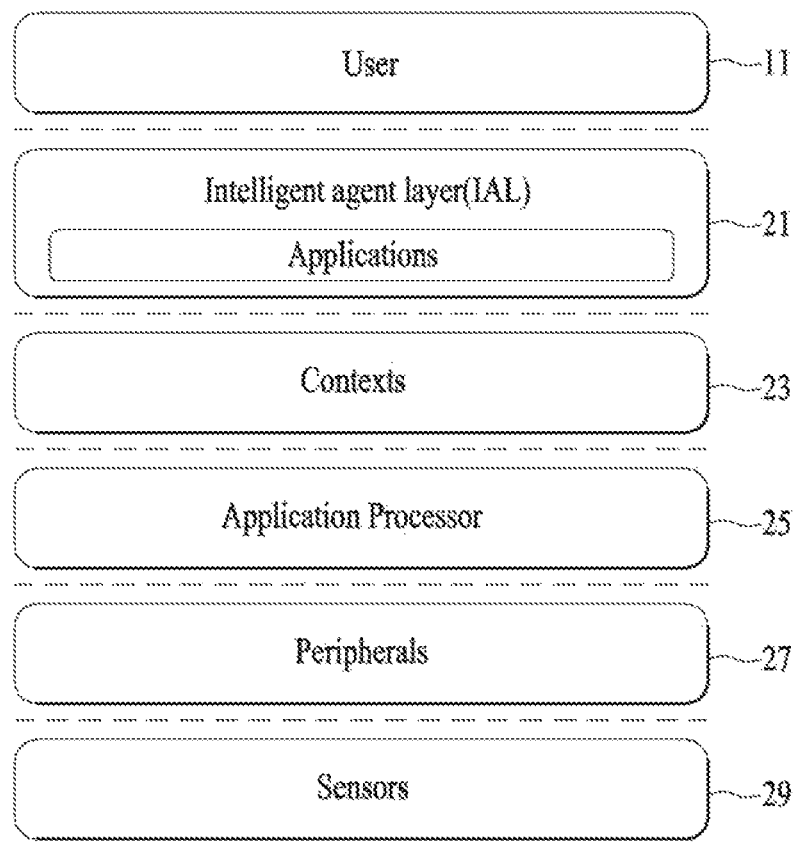
FIG. 9 is a diagram to hierarchically describe an intelligent agent system configured to sense a user context according to one embodiment of the present invention.

FIG. 9 is a diagram to hierarchically describe an intelligent agent system configured to sense a user context according to one embodiment of the present invention.

Referring to FIG. 9, an intelligent agent system may include a sensor 29, a peripheral module 27, an application processor 25, a context 23, and an intelligent agent layer (IAL) 21. A layer for sensing a user context without distinguishing hardware and software from each other is described with reference to FIG. 9 as follows.

First of all, the sensor 25 can collect surrounding environment information, information related to a terminal device and information related to a user. The peripheral module 27 can process the information collected by the sensor 25. And, the peripheral module 27 may include a GPS module, a short range communication module, and a communication module, which are capable of collecting location information, call log information and the like. In particular, the intelligent agent system can sense individual information configuring a context and process the sensed information using the sensor 29 and the peripheral module 27.

The application processor 25 can process the sensed information into meaningful information or is able to create the context 23 using the sensed information. For instance, although sensed heartbeat information is simple beat information, the application processor 25 can determine or sort sensed beat information into a heartbeat information or may create the sensed beat information into a single context 23 by processing it with a time and other information of a user. As mentioned in the foregoing information, the context 23 may be created through the application processor 25. The IAL 21 can output the created context 23 to the user using an application. And, the IAL 21 may send the created context 23 to a cloud (not shown in the drawing).

Figure 10:
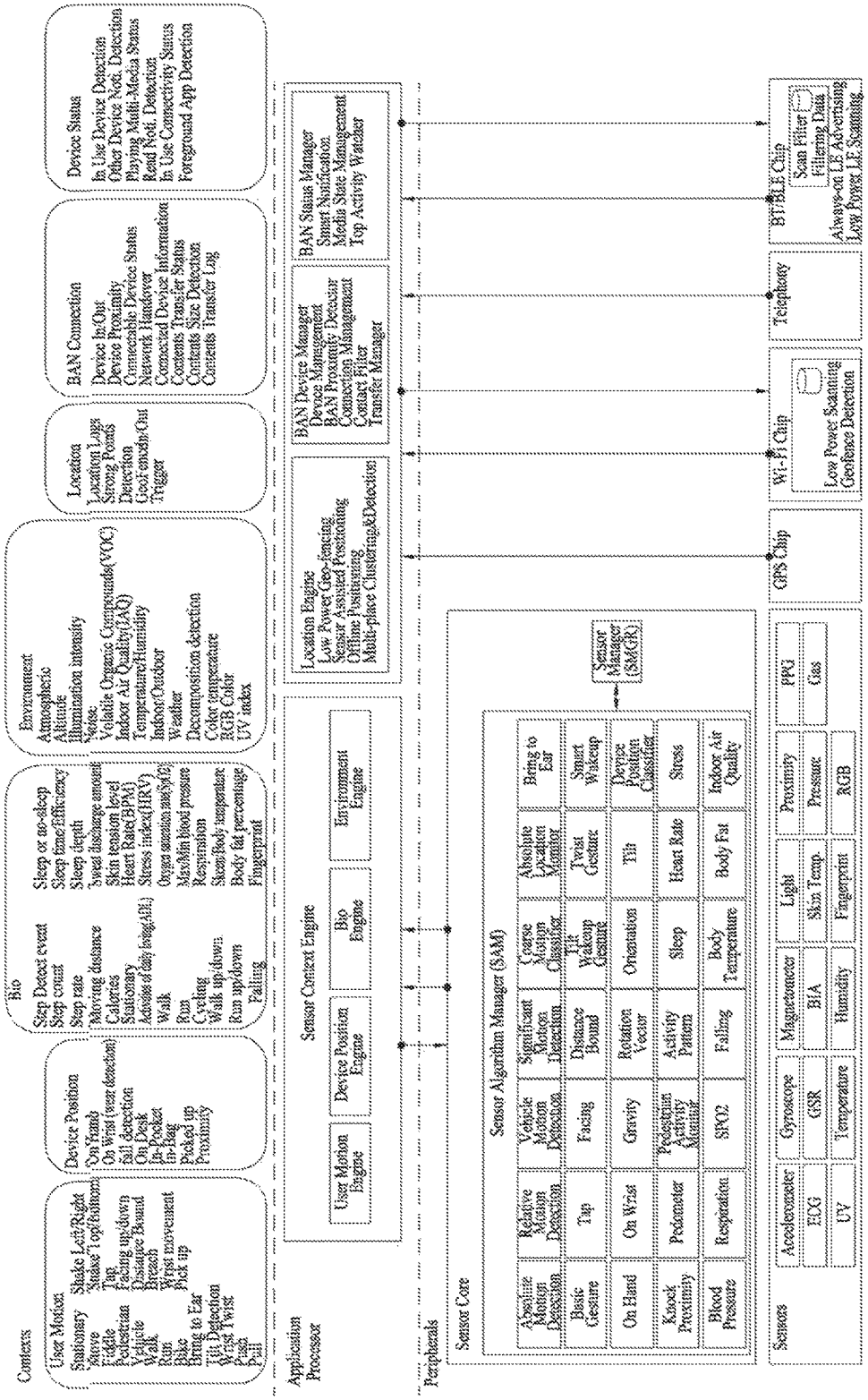
FIG. 10 is a diagram to describe a sensed user context information according to one embodiment of the present invention.

FIG. 10 is a diagram to describe sensed user context information according to one embodiment of the present invention. In particular, FIG. 10 shows a detailed example of an intelligent agent system layer for detecting a user context described with reference to FIG. 9.

Referring to FIG. 10, for instance, a sensor includes an acceleration sensor, a gyroscope sensor, a geomagnetic sensor, a proximity sensor, a humidity sensor and the like and is able to sense surrounding environment information. A peripheral module includes a sensor core, a GPS module, a short range communication module and the like and is able to process the information sensed by the sensor or collect call log information, location information and the like. An application processor may include various engines. Each of the various engines can create a context using related information. The created contexts can be sorted by types.

In the following description, a method of providing a user with context information using an intelligent agent (IA) on a mobile terminal is explained. Moreover, according to embodiments shown in FIGS. 11 to 28, as mentioned in the foregoing description with reference to FIGS. 6 to 10, methods of extracting various context information from an intelligent agent layer of a mobile terminal and then providing an IA service based on the extracted context information are described are described as follows. In this case, assume that the context information includes pre-saved context information on user's living pattern and the like in a server as well as information sensed through the mobile terminal. Moreover, for clarity, according to the embodiments shown in FIGS. 11 to 28, an IA service provided by an intelligent agent layer included in a mobile terminal is described as provided by the mobile terminal.

<IA Activation & Camera Activation>

Figure 11:
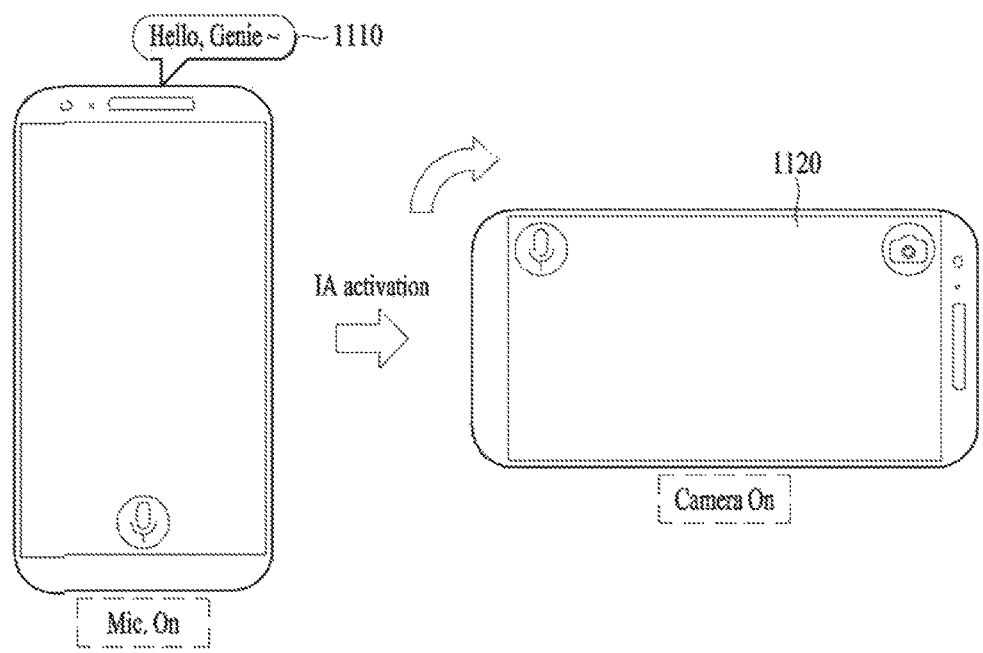
FIG. 11 is a diagram for one example of activating an intelligent agent (IA) in a mobile terminal according to one embodiment of the present invention.

FIG. 11 is a diagram for one example of activating an intelligent agent (IA) in a mobile terminal according to one embodiment of the present invention.

Referring to FIG. 11, first of all, as mentioned in the foregoing description, a mobile terminal can include an intelligent agent (hereinafter abbreviated IA). If the mobile terminal receives a trigger signal 1110, the mobile terminal can activate the IA. In particular, the IA in a deactivated state is included in the mobile terminal. If the trigger signal 1110 is received, the IA can be activated. In case that the IA is activated, the mobile terminal can provide IA information based on various context information.

In this case, the context information may mean information including various kinds of currently sensed information, a currently used application, a currently used file, a currently used data, a currently used content and the like. For instance, the context information of the present invention may include various information such as image context information, voice context information, location context information and the like.

Moreover, the trigger signal 1110 may correspond to one of signals of various types. For instance, referring to a $1^{st}$ diagram shown in FIG. 11, the trigger signal 1110 may correspond to a voice signal 'hello genie' sensed through a microphone. A content included in the voice signal may be configured variously. For instance, the trigger signal may correspond to an input signal applied to a physical button provided to the mobile terminal [not shown in FIG. 11]. For another instance, the trigger signal may correspond to a preset gesture touch input sensed by the mobile terminal [not shown in FIG. 11].

Yet, in doing so, the sensor for sensing the trigger signal may be assumed as staying in a turn-on state all the time. In particular, according to the embodiment shown in FIG. 11, while the microphone keeps maintaining the turn-on state, the mobile terminal can activate the IA by sensing the trigger signal through the microphone. Moreover, if the trigger signal is a touch input, the mobile terminal can control the touch sensor to stay in the turn-on state all the time.

For instance, if the IA is activated, the mobile terminal recognizes a voice and is able to provide IA information based on the recognized voice. In doing so, the mobile terminal sends the recognized voice to the server. Subsequently, the server can convert the received voice into a text. Moreover, based on the converted text, the server can search online for materials related to the converted text. Subsequently, the server can send the found materials as IA information to the mobile terminal. In particular, if the IA is activated and recognizes a voice, the mobile terminal provides the IA information that is based on the recognized voice information only. Moreover, the method of providing the IA information through the voice recognition is non-limited by the above-described embodiment. Alternatively, it is able to provide IA information through various methods.

Moreover, referring to a $1^{st}$ diagram shown in FIG. 11, if the IA is activated, the mobile terminal can output an indicator, which indicates that a voice recognition is available, to the display unit. For instance, the indicator indicating that the voice recognition is available can be represented as a shape of a microphone or outputted in one of various shapes.

Meanwhile, referring to a $2^{nd}$ diagram shown in FIG. 11, while the IA is activated, the mobile terminal can sense a preset input signal 1120. In this case, the preset input signal 1120 may correspond to a signal for activating a camera. Moreover, the preset input signal may correspond to a signal corresponding to a preset motion of the mobile terminal or a signal indicating that the mobile terminal is situated at a preset angle. For instance, according to an embodiment shown in FIG. 11, the preset input signal may correspond to a motion of switching the mobile terminal to a landscape mode from a portrait mode. Moreover, for instance, the preset input signal may correspond to a preset gesture input of swaying the mobile terminal right and left or back and forth or rotating the mobile terminal [not shown in FIG. 11].

In this case, in response to the preset input signal, the mobile terminal activates the camera and is then able to sense an image in a view angle area through the camera. For instance, the image sensed by the activated camera may be outputted while an IA related application is run instead of a camera application installed on the mobile terminal. Moreover, for instance, while the IA related application is run, the mobile terminal can output a preview image sensed by the camera to the display unit.

Meanwhile, referring to the $2^{nd}$ drawing shown in FIG. 11, if the IA and camera are activated, the mobile terminal can output an indicator indicating an image recognition is available as well as a voice recognition. For instance, the indicator indicating that the image recognition is available can be represented in a shape of a camera or may be outputted in one of various shapes.

In the following description, while both an IA and a camera are activated, a method of providing a service of the IA through an image input according to the present invention is explained.

<Providing IA Service Through Voice & Image Inputs>

Figure 12:
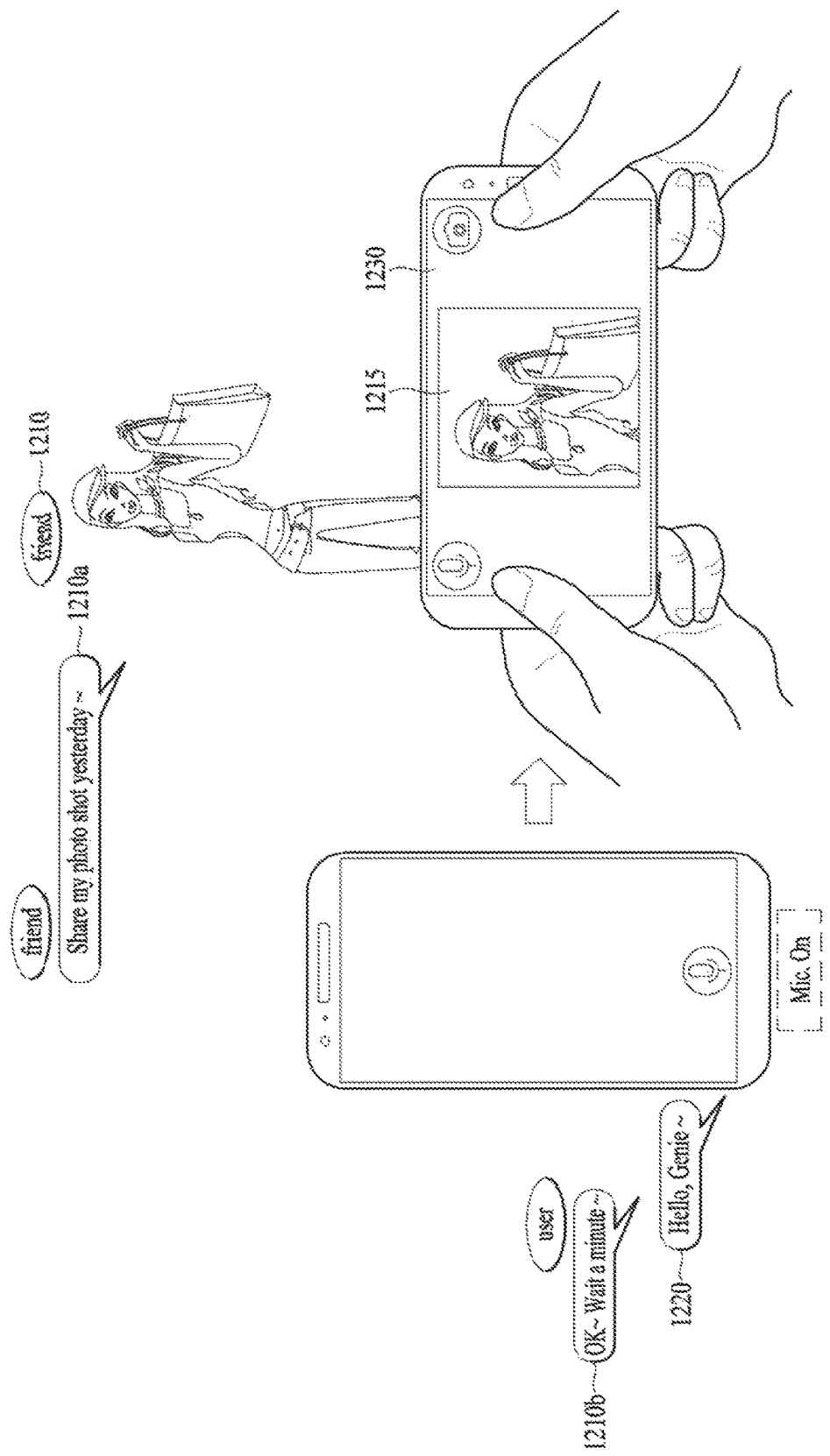
FIG. 12 is a diagram for one example of providing an IA service through a voice input and an image input in a mobile terminal according to one embodiment of the present invention.

FIGS. 12 to 14 show a method of providing an IA service through a voice input and an image input. Moreover, the contents related to a voice input in the embodiments shown in FIGS. 12 to 14 are assumed as identical to the former voice recognition function described with reference to FIG. 11.

First of all, FIG. 12 is a diagram for one example of providing an IA service through a voice input and an image input in a mobile terminal according to one embodiment of the present invention.

As mentioned in the foregoing description with reference to FIG. 11, according to the present invention, the microphone provided to the mobile terminal may be in the turn-on state all the time. And, the mobile terminal can continue to store a voice signal sensed through the microphone. In this case, for instance, the mobile terminal can repeatedly perform an operation of storing a voice signal sensed during a preset time and deleting the stored voice signal. For instance, the mobile terminal sends the sensed voice signal to the server so that the voice signal can be saved as user's voice context information.

Referring to a $1^{st}$ diagram shown in FIG. 12, the mobile terminal can sense a trigger signal 1220 from a user. Hence, the mobile terminal can activate an IA. Moreover, the mobile terminal can sense conversations 1210a and 1210b between a user of the mobile terminal and a friend of the user as a voice signal. In this case, assume that the sensed voice signal is a signal sensed in a preset time range (hereinafter named a $1^{st}$ time range) set to cover a range before and after a timing point of sensing the trigger signal or a timing point of activating the IA. Moreover, the sensed voice signal may correspond to user's voice context information.

In response to a preset input signal, the mobile terminal can activate a camera. In this case, as shown in a $2^{nd}$ drawing of FIG. 12, the mobile terminal can sense an object located within a view angle area of the camera.

Moreover, based on the voice signal sensed in the $1^{st}$ time range and the image sensed through the camera, the mobile terminal can provide an IA service. According to the embodiment shown in FIG. 12, the IA of the mobile terminal can detect user's intent (i.e., intent to share a photo with a friend, an action to share a photo with a friend, etc.) through a voice signal of 'Share my photo taken yesterday' sensed from a friend 1210 and a voice signal of 'OK, wait a minute' sensed from the user. Moreover, after a voice signal has been sensed, the mobile terminal can sense an image.

Through this, the IA recognizes a face of an object included in a sensed image 1215 and is then able to search for an image related to the recognized face in accordance with the user's intent. In particular, based on voice context information and image context information received from the mobile terminal, the server searches the related materials and is then able to send the found materials to the mobile terminal. Moreover, the IA can provide the user with a search result of the image related to the recognized face as an IA service. A type or scheme of providing the IA service shall be described in detail with reference to FIG. 13A and FIG. 13B later.

Meanwhile, according to the embodiment shown in FIG. 12, while the camera is activated, the mobile terminal outputs the sensed image to the display unit 1230. Alternatively, while the camera is activated, the mobile terminal can directly provide the IA service without outputting the sensed image to the display unit.

Figure 13A:
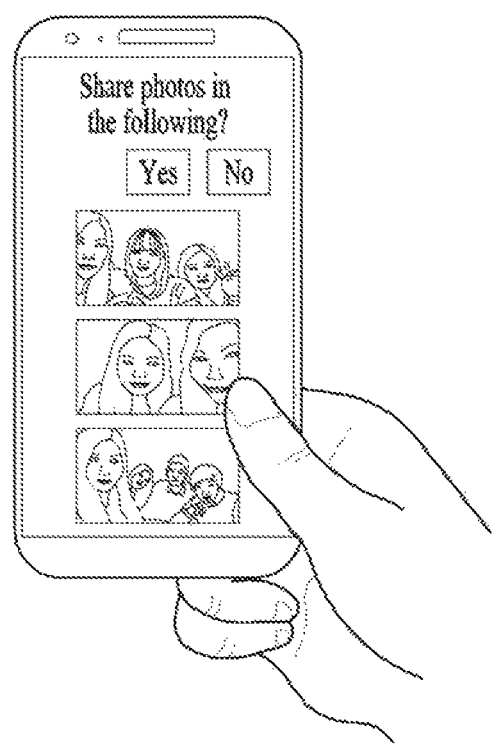
FIGS. 13A and 13B are diagrams for one example of an IA service provided type in case of sensing an image input in an IA activated state according to the embodiment shown in FIG. 12.
Figure 13B:
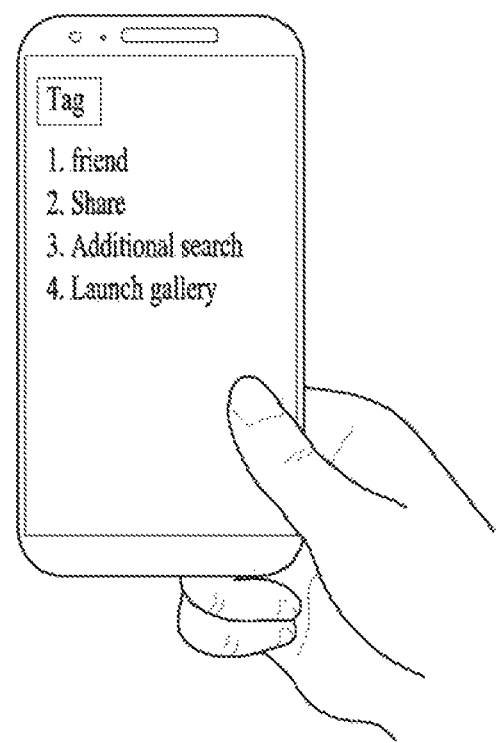

FIG. 13A and FIG. 13B are diagrams for one example of an IA service provided type or scheme in case of sensing an image input in an IA activated state according to the embodiment shown in FIG. 12. In particular, the embodiment shown in FIG. 13A and FIG. 13B corresponds to a type of an IA service provided to a user as a result of the voice and image inputs described with reference to FIG. 12.

For instance, based on image context information and voice context information, the mobile terminal can output IA information that matches user's intent. For instance, according to the embodiment shown in FIG. 13A, the mobile terminal can output a screen for sharing a previously captured image of a friend. Through this, a user can facilitate friend's image to be shared with a mobile terminal of the friend having requested the image.

For another instance, based on image context information and voice context information, the mobile terminal can output an information matching user's intent and information related to the information matching the user's intent as IA information of a tag type. Referring to FIG. 13B, the mobile terminal ma output at least one tag information related to user's intent. In this case, the tag information may correspond to a word or keyword to use in searching for specific information. Moreover, for instance, the tag information may correspond to an information a user may additionally search for as well as the information provided as the IA information.

In particular, the IA can provide a tag related to user's intent as an IA service by obtaining the user's intent from a voice signal and an image signal. In this case, the tag is a menu option for performing a function corresponding to the tag. If an input signal applied to the tag is sensed, an additional function may be launched.

According to the embodiment shown in FIG. 13B, the tag may include a menu option for launching a name of a friend, an image sharing, an additional image search, and an image included gallery. Besides, if an input signal for a name of a friend is sensed, for example, the mobile terminal can additionally output friend related information such as friend's contact information, friend's image information and the like [not shown in FIG. 13A and FIG. 13B]. Moreover, if an input signal for an image sharing is sensed, for example, the mobile terminal may guide a user to share an image by outputting an IA service screen shown in FIG. 13A. Moreover, if an input signal for an additional search is sensed, the mobile terminal additionally searches for friend's image saved in the server as well as friend's image saved in the mobile terminal and is then able to output the found image. Furthermore, the IA can output various tags without being limited by the above-mentioned embodiment. Various information may be outputted in response to input signals for the various tags, respectively.

Besides, the mobile terminal may output both information related to user's intent and tag information of the information related to the user's intent to the display unit simultaneously [not shown in FIG. 13]. Although one example of providing IA information as a visual information to the display unit is described in the embodiment described with reference to FIG. 13A and FIG. 13B, the IA information can be provided to a user in various ways (e.g., voice information, etc.).

FIG. 14 is a diagram for one example of providing an IA service through a voice input and an image input in a mobile terminal according to one embodiment of the present invention.

Referring to FIG. 14, the mobile terminal can activate an IA in response to a trigger signal 1420. Moreover, while the IA is activated, the mobile terminal can activate the camera in response to a preset input signal 1430. For instance, the preset input signal 1430 may correspond to a signal for adjusting an angle to photograph an image in landscape mode.

Moreover, referring to a $1^{st}$ diagram shown in FIG. 14, the mobile terminal can sense a voice signal 1410. In this case, the voice signal may correspond to a signal sensed in a preset time range set to cover a range before and after a timing point of sensing the trigger signal or a timing point of activating the IA. According to the embodiment shown in FIG. 14, if a voice signal 'how much is it?' is sensed, the IA can obtains user's intent from the voice signal 1410.

Moreover, the mobile terminal can sense an object within a view angle area through the camera. According to the example shown in FIG. 14, the mobile terminal can sense an image of a laptop computer. In this case, the IA can receive information related to the laptop computer from the server.

In particular, the IA obtains user's intent from a voice signal and an image input and is then able to provide an IA service. According to the embodiment shown in FIG. 14, in accordance with user's intent to know a price of the laptop computer, the IA can output a type and price information of the laptop computer included in the sensed image to the display unit as IA information 1440. Meanwhile, the IA can output tag information as additional IA information on the laptop computer designated by the user. For instance, according to the embodiment shown in FIG. 14, a tag may correspond to information on a product similar to the laptop computer designated by the user.

Through the embodiments shown in FIGS. 12 to 14, in order to obtain information desired by a user, more accurate information can be provided in a manner of adding an image input to a voice input.

According to embodiments described with reference to FIGS. 15 to 27 in the following, an IA service is provided based on one of various image inputs. In this case, the image inputs may include an image sensed by a camera, an image captured by adding an input signal to an image sensed by a camera, an image of taking a screen shot of an information outputted to a display unit of a mobile terminal, and the like.

<Providing IA Service Based on Image Sensed by Camera & Location Information>

According to embodiments described with reference to FIGS. 15 to 17, an IA service is provided on a mobile terminal based on a real-time image sensed by a camera and location information of the mobile terminal. According to embodiments described with reference to FIGS. 15 to 17, a location information of a mobile terminal is assumed as sensed through one of a GPS sensor, a camera, a gyroscope sensor, a geomagnetic sensor and the like, which are provided to the mobile terminal.

Figure 15:
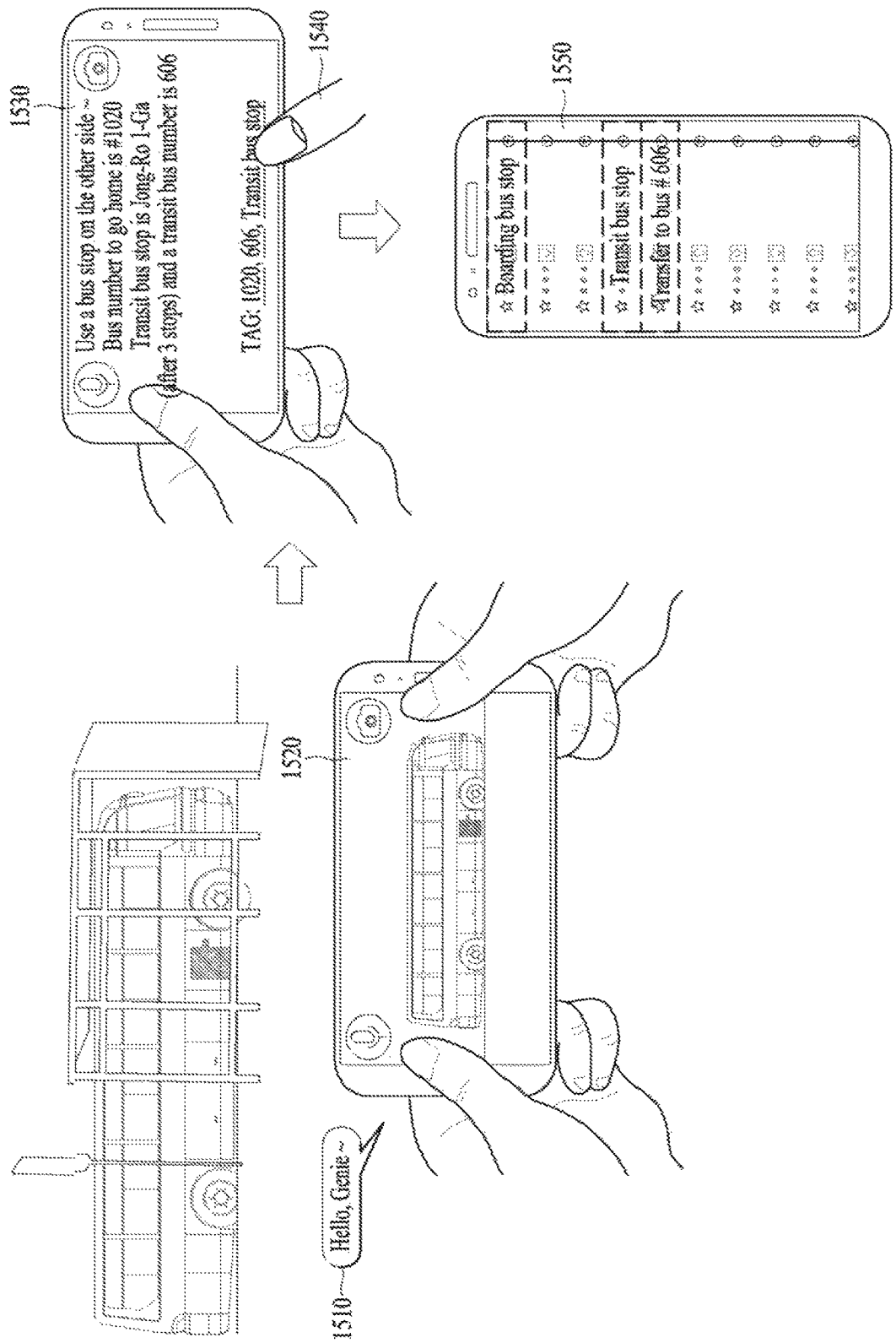
FIG. 15 is a diagram for one example of providing an IA service based on a sensed image and location information in a mobile terminal according to one embodiment of the present invention.

First of all, FIG. 15 is a diagram for one example of providing an IA service based on a sensed image and location information in a mobile terminal according to one embodiment of the present invention.

Referring to FIG. 15, a mobile terminal activates an IA in response to a trigger signal 1510 and is also able to activate a camera in response to a preset input signal 1520. And, the mobile terminal can sense location information of the mobile terminal. According to the embodiment shown in FIG. 15, the location information of the mobile terminal may correspond to a place near a bus stop. And, the location information of the mobile terminal may correspond to location context information.

Moreover, the mobile terminal can sense an image within a view angle area. In this case, the image within the view angle area may correspond to image context information. Referring to a $1^{st}$ diagram shown in FIG. 15, the mobile terminal can sense a city bus within the view angle area.

In this case, the mobile terminal can obtain or determine user's intent based on location context information and image context information. In particular, based on the location context information and the image context information received from the mobile terminal, a server searches for related materials and is then able to send the found materials to the mobile terminal. Moreover, the mobile terminal can extract an IA activated time as time context information as well as location information and a sensed image [not shown in FIG. 15]. In particular, according to the embodiment shown in FIG. 15, based on a fact that a user is located at a place near the bus stop and a fact that an image of a specific image is sensed at a late night time, the mobile terminal can determine a situation that the user intends to take a bus to go home. Hence, the mobile terminal can provide an IA service corresponding to a method for the user to go home from a currently located bus stop.

For instance, referring to a $2^{nd}$ diagram shown in FIG. 15, the mobile terminal can output IA information 1530 to a display unit. In particular, the IA information may include information, which indicates that the user should use a corresponding but not at the currently located place but at a bus stop across the street, and information on a transit bus. And, the IA information may include such tag information as a bus number to currently ride, a transit bus number, and a transit bus stop. Meanwhile, the mobile terminal may be able to provide IA information as a voice service [not shown in FIG. 15].

Meanwhile, the mobile terminal can sense an input signal 1540 for the tag information. In this case, as shown in a $3^{rd}$ diagram of FIG. 15, the mobile terminal can output additional information 1550 on a transit bus stop.

Figure 16:
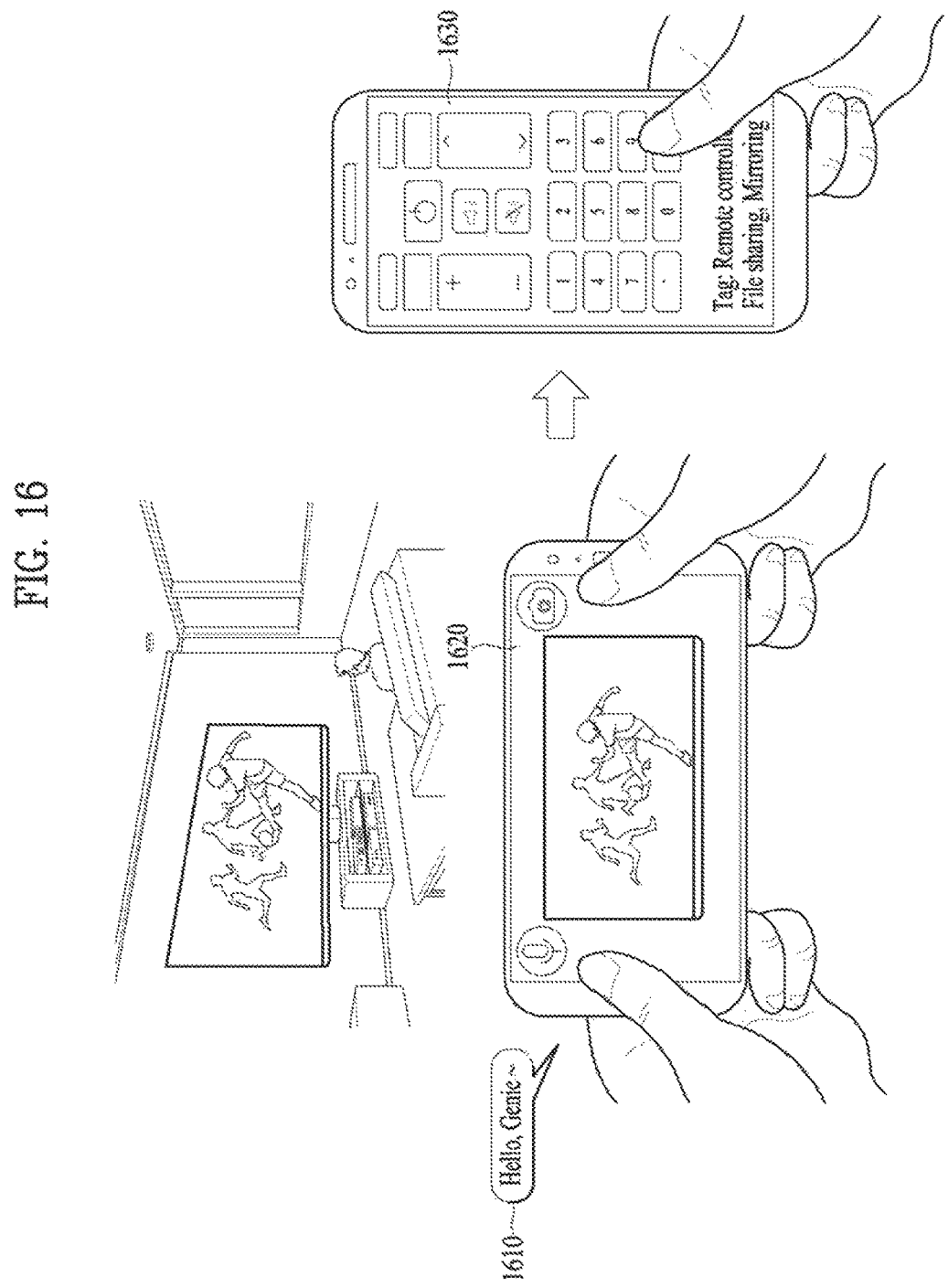
FIG. 16 and FIG. 17 are diagrams for one example of a method of providing an IA service in case of a different location information despite a same sensed image in a mobile terminal according to one embodiment of the present invention.
Figure 17:
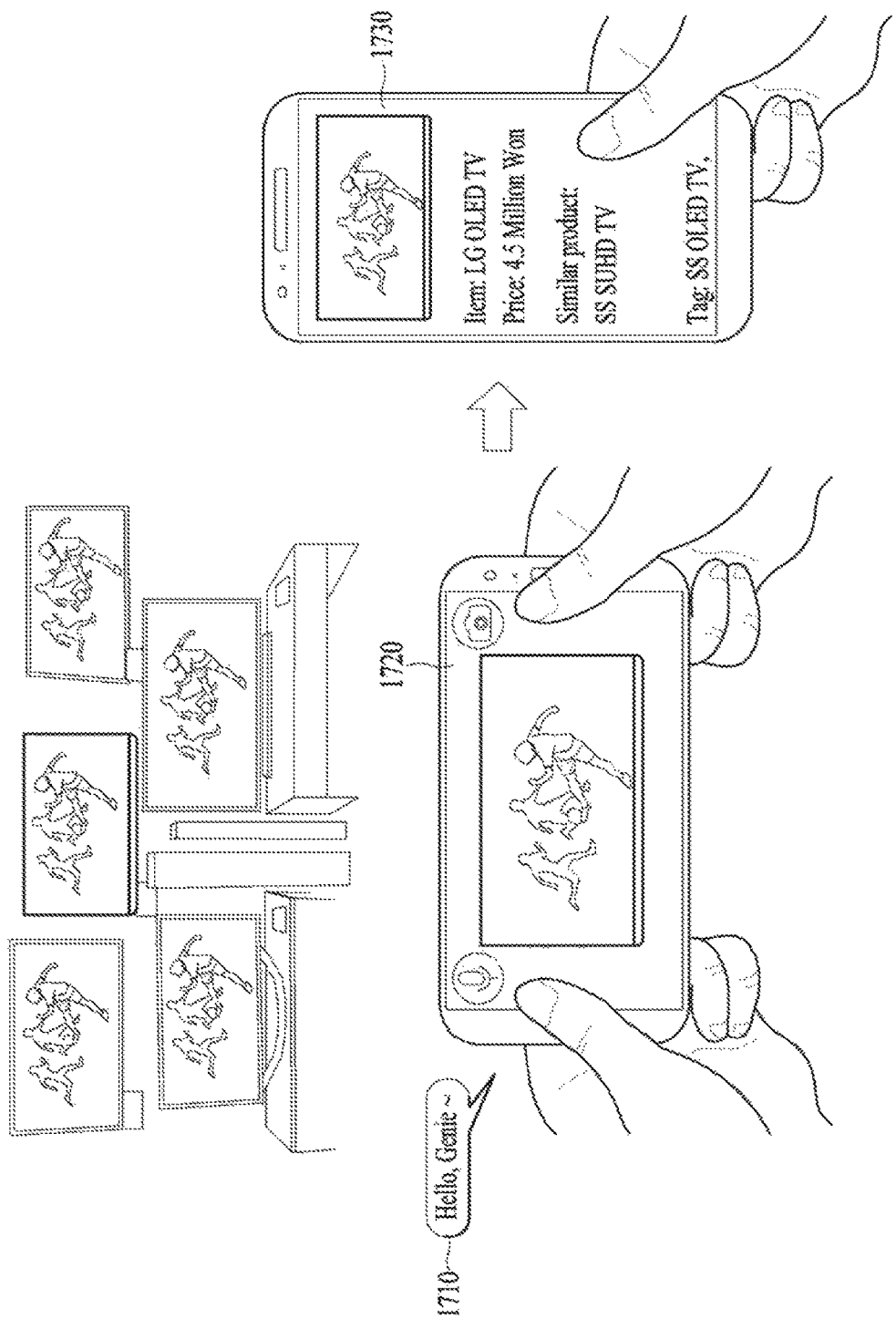

FIG. 16 and FIG. 17 are diagrams for one example of a method of providing an IA service in case of different location information despite a same sensed image in a mobile terminal according to one embodiment of the present invention.

In particular, while an IA is activated, if a same object is sensed through a camera, FIG. 16 and FIG. 17 shows an IA service provided depending on a different sensed location information.

First of all, referring to FIG. 16 and FIG. 17, a mobile terminal activates an IA in response to a trigger signal 1610/1710 and is then able to activate a camera in response to a preset input signal 1620/1720. And, the mobile terminal can sense an object within a view angle area through the activated camera. In this case, the sensed object may correspond to a television. Meanwhile, the mobile terminal can sense current location information of the mobile terminal.

For instance, referring to FIG. 16, the mobile terminal can sense that location information of the mobile terminal is an inside of a house. In this case, the mobile terminal can determine or decide that the user's intent to sense the television is to output a remote controller of the television. In particular, based on location context information and image content information received from the mobile terminal, a server searches for related materials and is then able to send the found materials to the mobile terminal. Hence, the mobile terminal can display a remote controller interface, which is provided as IA information, on a display unit. Moreover, the mobile terminal can output texts including a remote controller, a mirroring and the like as tag information.

For another example, referring to FIG. 17, the mobile terminal can sense that location information indicates a department store or a mart. In this case, the mobile terminal can determine that user's intent is to purchase a television. Hence, referring to a $2^{nd}$ diagram shown in FIG. 17, the mobile terminal can display a model name and price information of a sensed television as IA information. Moreover, the mobile terminal can output a product similar to the corresponding television as tag information provided as a text.

Through the embodiments shown in FIGS. 15 to 17, a user can easily obtain IA information, by which user's intent is reflected, from an object specified by the user and a user located place.

<Providing IA Service Based on Plurality of Images Sensed by Camera>

According to embodiments described with reference to FIG. 18 and FIG. 19, an IA service is provided by a mobile terminal based on a plurality of real-time images sensed by a camera. In this case, the sensed image indicates a real-time preview image sensed through the camera and corresponds to an image different from an image captured by user's additional input.

Figure 18:
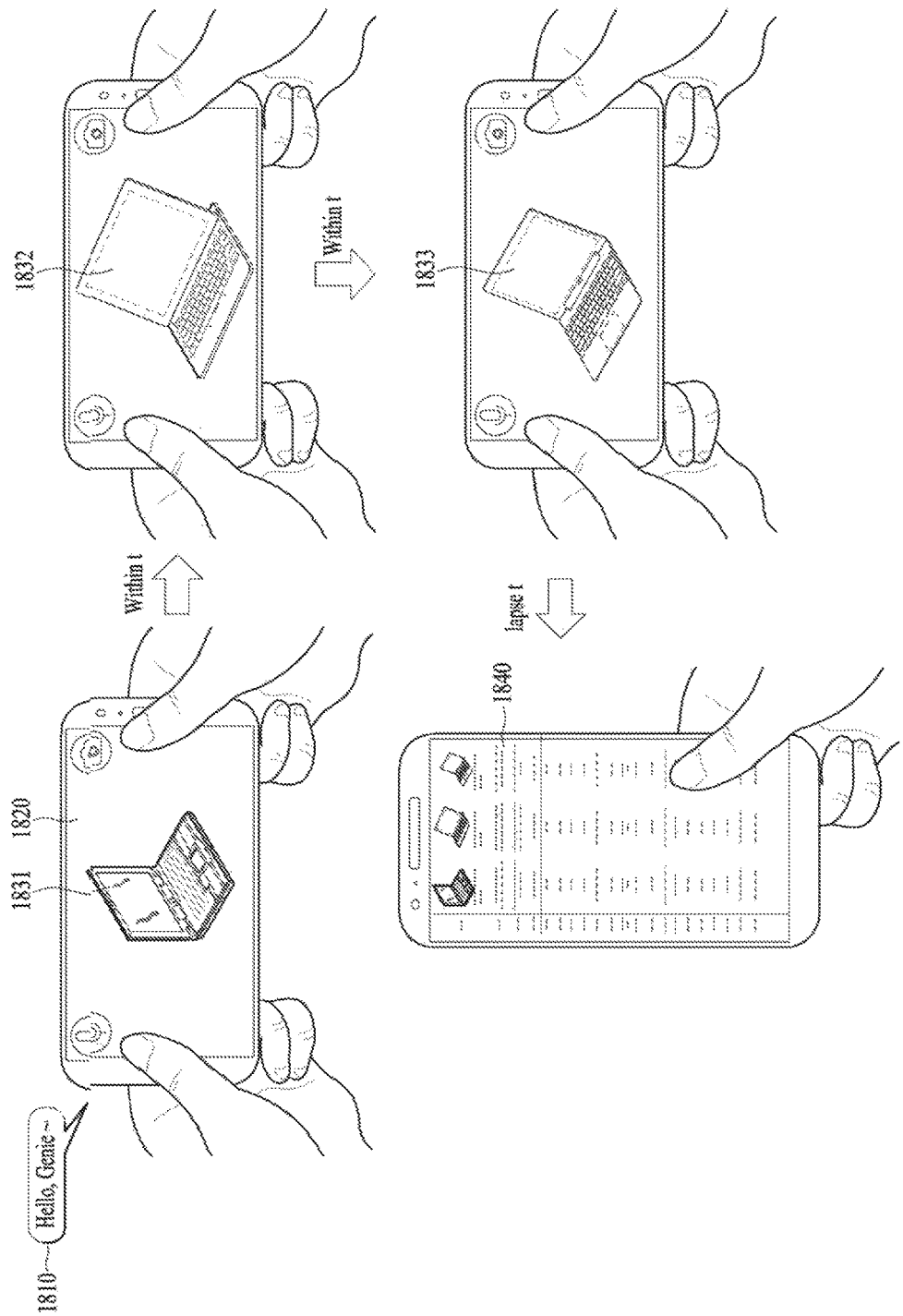
FIG. 18 is a diagram for one example of providing an IA service based on a plurality of sensed images in a mobile terminal according to one embodiment of the present invention.

First of all, FIG. 18 is a diagram for one example of providing an IA service based on a plurality of sensed images in a mobile terminal according to one embodiment of the present invention. In particular, in case that objects respectively included in a plurality of images are similar to each other or have the same feature, FIG. 18 shows a method of providing a corresponding IA service.

Referring to a $1^{st}$ diagram shown in FIG. 18, a mobile terminal activates an IA in response to a trigger signal 1810 and is able to activate a camera in response to a preset input signal 1820 in the IA activated state.

The mobile terminal can sense a $1^{st}$ object 1831 by the activated camera. In the $1^{st}$ diagram of FIG. 18, the $1^{st}$ object 1831 corresponds to a laptop computer. The mobile terminal can sense a $2^{nd}$ object 1832 in a preset time t from a timing point of sensing the $1^{st}$ object 1831. Referring to a $2^{nd}$ diagram shown in FIG. 18, the $2^{nd}$ object 1832 may correspond to another laptop computer of a type different from that of the $1^{st}$ object 1831. Moreover, the mobile terminal can sense a $3^{rd}$ object 1833 in a preset time t from a timing point of sensing the $2^{nd}$ object 1832. Referring to a $3^{rd}$ diagram shown in FIG. 18, the $3^{rd}$ object 1833 may correspond to another laptop computer of a type different from that of the $1^{st}$ object 1831 or the $2^{nd}$ object 1832.

On the other hand, the preset time may expire without sensing an additional object in a preset time t from the timing point of sensing the $3^{rd}$ object 1833. In this case, the mobile terminal can obtain or determine user's intent to compare the $1^{st}$ to $3^{rd}$ objects 1831 to 1833 to each other. In particular, based on a plurality of image context information received from the mobile terminal, a server searches for related materials and is then able to send the found materials to the mobile terminal.

Hence, the mobile terminal can output IA information based on a plurality of the sensed images. Referring to a $4^{th}$ diagram shown in FIG. 18, the mobile terminal can output the IA information, which compares the $1^{st}$ to $3^{rd}$ objects 1831 to 1833 to each other, to a display unit. For instance, the IA information shown in FIG. 18 can include a prices and features of each of the objects and the like.

Meanwhile, according to the embodiment shown in FIG. 18, the case of sensing the $1^{st}$ to $3^{rd}$ objects is described. Furthermore, if an additional object is sensed in a preset time after sensing the $3^{rd}$ object, the mobile terminal may provide the IA information in consideration of the additional object as well.

Figure 19:
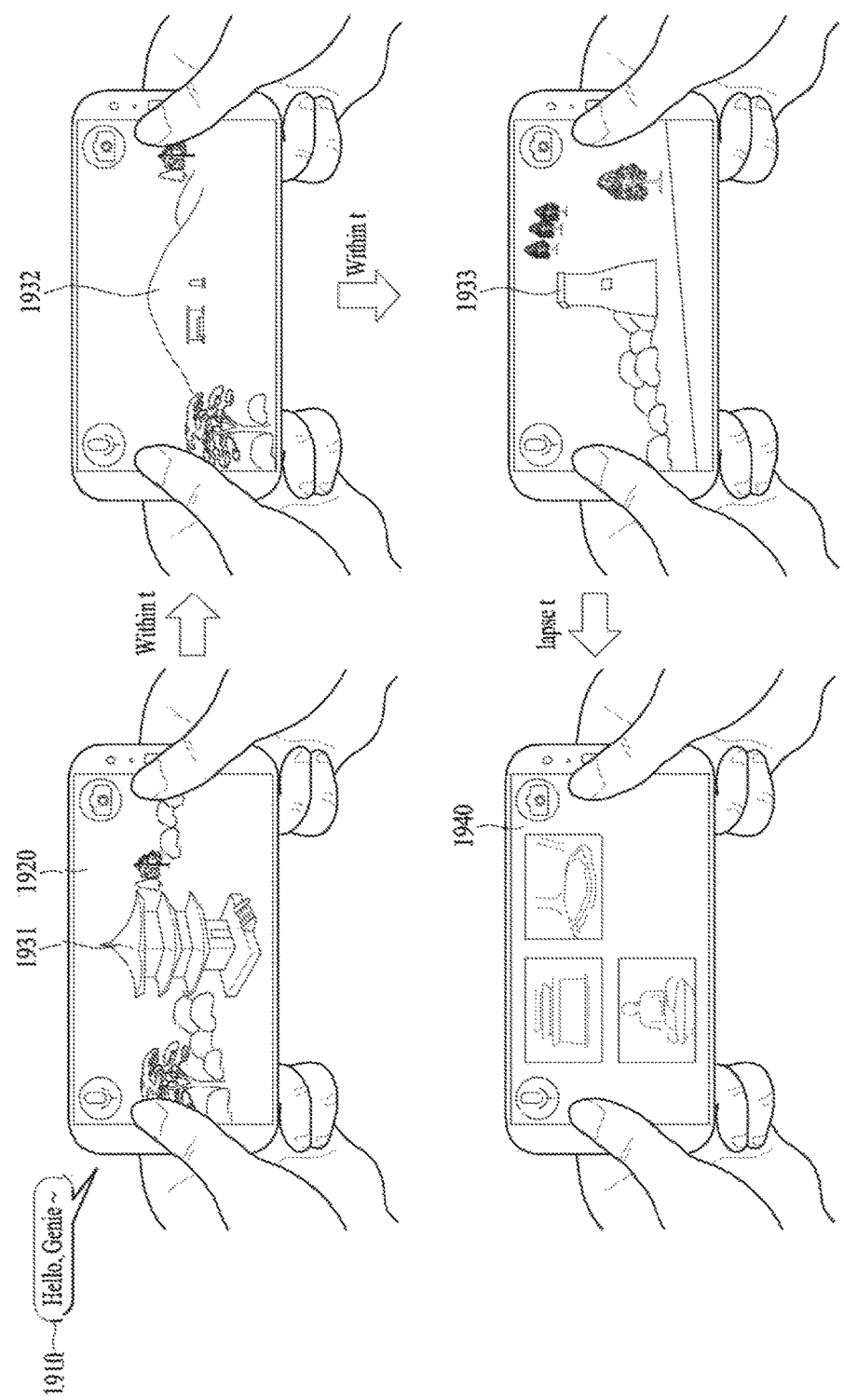
FIG. 19 is a diagram for another example of providing an IA service based on a plurality of sensed images in a mobile terminal according to one embodiment of the present invention.

FIG. 19 is a diagram for another example of providing an IA service based on a plurality of sensed images in a mobile terminal according to one embodiment of the present invention. In particular, in case that objects respectively included in a plurality of images are similar to each other or have the same feature, FIG. 19 shows a method of providing a corresponding IA service.

Referring to a $1^{st}$ diagram shown in FIG. 19, a mobile terminal activates an IA in response to a trigger signal 1910 and is able to activate a camera in response to a preset input signal 1920 in the IA activated state.

The mobile terminal can sense a $1^{st}$ object 1931 by the activated camera. In the $1^{st}$ diagram of FIG. 19, the $1^{st}$ object 1931 corresponds to a cultural asset of a specific area. The mobile terminal can sense a $2^{nd}$ object 1932 in a preset time t from a timing point of sensing the $1^{st}$ object 1931. Referring to a $2^{nd}$ diagram shown in FIG. 19, the $2^{nd}$ object 1932 may correspond to another cultural asset different from the $1^{st}$ object 1931. Moreover, the mobile terminal can sense a $3^{rd}$ object 1933 in a preset time t from a timing point of sensing the $2^{nd}$ object 1932. Referring to a $3^{rd}$ diagram shown in FIG. 19, the $3^{rd}$ object 1933 may correspond to another cultural asset different from the $1^{st}$ object 1931 or the $2^{nd}$ object 1932. Furthermore, the mobile terminal can sequentially sense a plurality of objects corresponding to different cultural assets in a preset time t from the timing point of sensing the $3^{rd}$ object 1933 [not shown in the drawing].

On the other hand, the preset time may expire without sensing an additional object in a preset time t from a timing point of sensing a last object. In this case, the mobile terminal can obtain or determine user's intent based on a plurality of the sensed objects. According to the embodiment shown in FIG. 19, the mobile terminal can determine that the user's intent is to visit cultural assets. Hence, the mobile terminal can output IA information by obtaining the user's intent. Referring to a 4$^{th}$ diagram shown in FIG. 19, the mobile terminal can output images of other cultural assets 1940 failing to be visited by the user than a plurality of the sensed objects. In doing so, the outputted images of other cultural assets may correspond to cultural assets located in the same area in which the cultural assets corresponding to a plurality of the objects sensed by the mobile terminal are located.

Through the embodiments shown in FIG. 18 and FIG. 19, in case that images are sequentially inputted in a predetermined time, a user can easily obtain additional information related to the inputted images.

<Providing IA Service Based on Plurality of Images Captured by Camera>

According to embodiments described with reference to FIGS. 20 to 23 in the following, a mobile terminal provides an IA service based on an image captured in a manner of additionally applying user's input signal to an image sensed by a camera.

Figure 20:
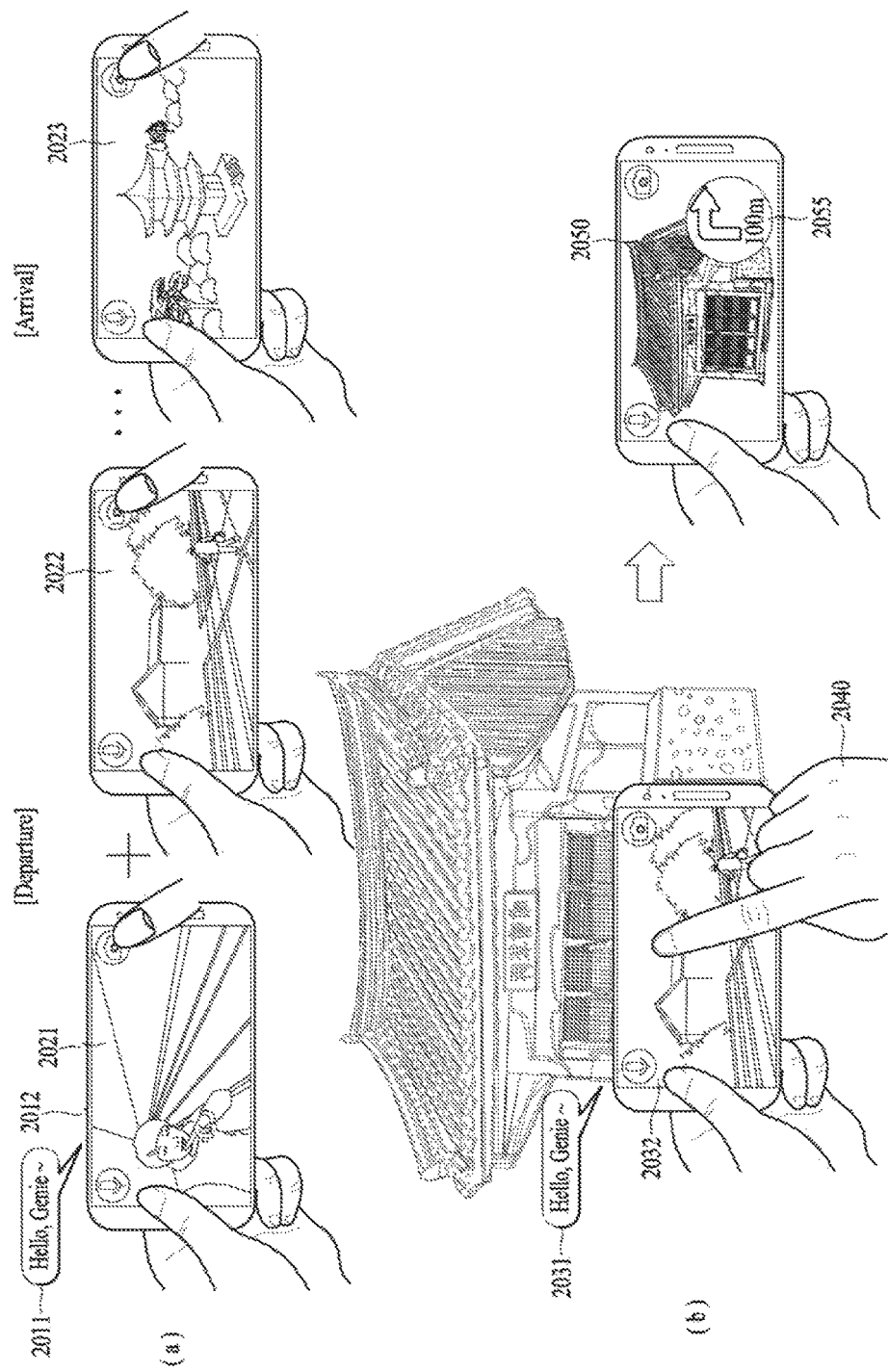
FIG. 20 is a diagram for one example of providing an IA service based on a plurality of captured images in a mobile terminal according to one embodiment of the present invention.

First of all, FIG. 20 is a diagram for one example of providing an IA service based on a plurality of captured images in a mobile terminal according to one embodiment of the present invention.

In particular, FIG. 20 shows one embodiment of providing a user with a road guide based on a plurality of captured images and location information. In more particular, FIG. 20 (a) shows one example of consecutively capturing a plurality of images through a camera, and FIG. 20 (b) shows one example of providing an IA service based on a captured image. Moreover, according to the embodiment shown in FIG. 20, the mobile terminal is assumed as including a camera disposed on a front side and a camera disposed on a rear side.

First of all, referring to a 1$^{st}$ diagram shown in FIG. 20 (a), the mobile terminal activates an IA in response to a trigger signal 2011 and is able to activate the camera in response to a preset input signal 2012 in the IA activated state.

Referring to the 1$^{st}$ diagram shown in FIG. 20 (a), the mobile terminal can capture user's face image 2021 through the camera provided to the front side. In doing so, as shown in FIG. 20 (a), the mobile terminal can sense an input signal for an image capture. Referring to a 2$^{nd}$ diagram shown in FIG. 20 (a), the mobile terminal can capture an image 2022 of a place located in front through the camera provided to the rear side. In particular, the user can capture an image of a face of the user and an image indicating a specific place. In this case, the specific place may correspond to user's tour start place. Through this, the mobile terminal can recognize that an itinerary starts from a current location. Meanwhile, the image capturing order shown in the 1$^{st}$ and 2$^{nd}$ diagrams shown in FIG. 20 (a) can be reversed.

Subsequently, the mobile terminal traces location information until arriving at a place of arrival and is then able to save the traced location information as a moving route [not shown in FIG. 20]. Moreover, referring to a 3$^{rd}$ diagram shown in FIG. 20 (a), the mobile terminal is located at the place of arrival and is then able to capture an image 2023 of a place located in front through the camera provided to the rear side. In this case, the mobile terminal can determine that it is located at the place of arrival. In doing so, assume that the IA keeps being activated between a start timing point of the itinerary and a timing point of arrival.

In particular, through the above-mentioned image capture, the mobile terminal can obtains a start point, a moving route and an arrival point of the user's itinerary.

Meanwhile, the user may be unable to obtain a current location in the course of touring or may desire to return to the start point. In doing so, as shown in a 1$^{st}$ diagram of FIG. 20 (b), the mobile terminal activates an IA in response to a trigger signal 2031 and is able to activate the camera in response to a preset input signal 2032 in the IA activated state.

Moreover, referring to the 1$^{st}$ diagram shown in FIG. 20 (b), the mobile terminal can output an image captured at a time corresponding to at least one of the start timing point and the arrival timing point of the itinerary. For instance, the mobile terminal can output an image captured according to user's input signal (not shown in the drawing). In doing so, the mobile terminal can sense an additional input signal 2040 for the image captured at the start or arrival timing point. In this case, the mobile terminal can obtain user's intent to be guided to a route for returning to the start place or point.

Hence, referring to a 2$^{nd}$ diagram shown in FIG. 20 (b), the mobile terminal outputs a front image 2050 sensed by the camera provided to the rear side to the display unit and is able to output an indicator 2055 indicating the road guide as IA information to the image. Through this, the user can be guided with the road to the start place by the IA information.

Figure 21:
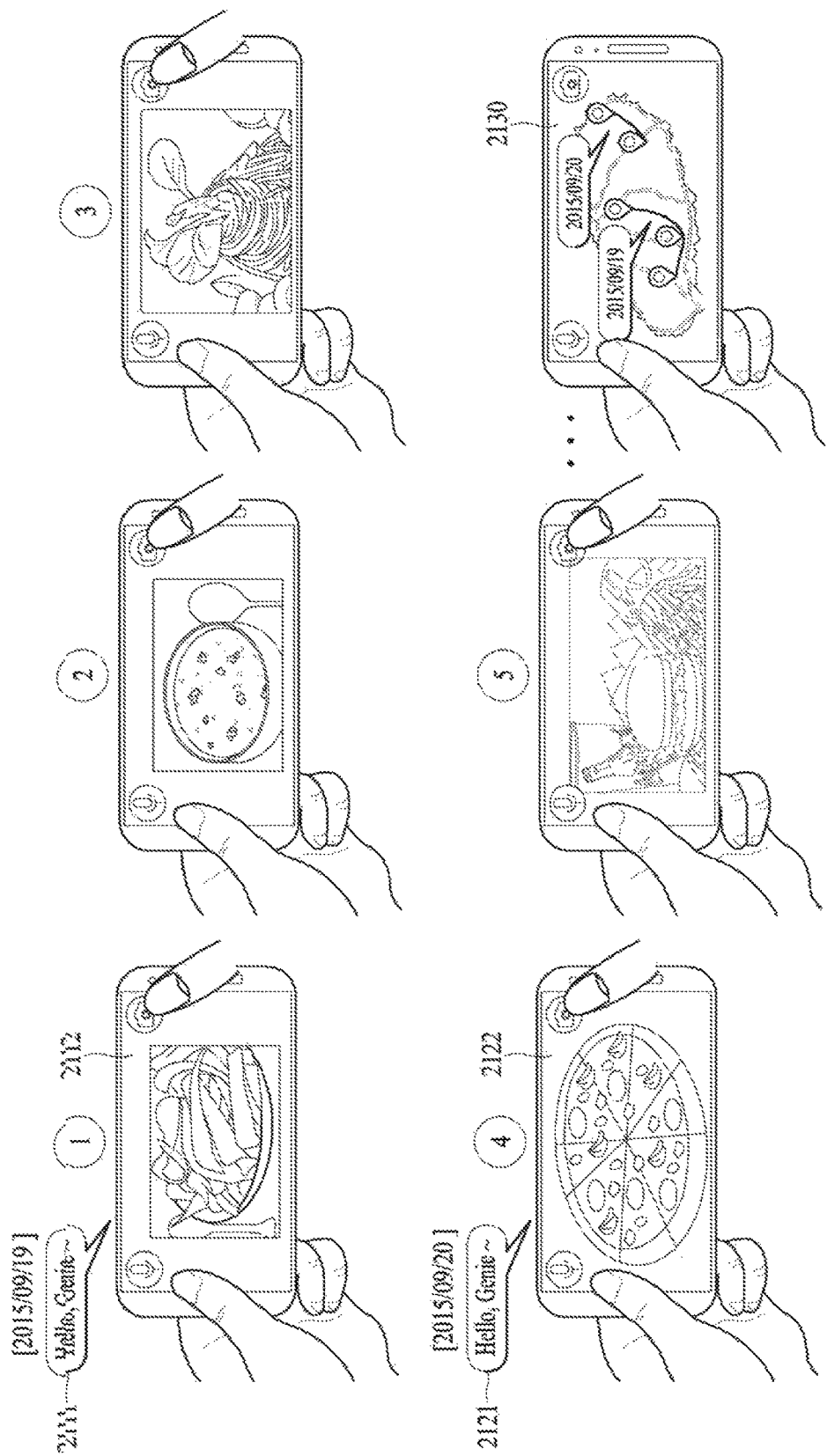
FIG. 21 is a diagram for another example of providing an IA service based on a plurality of captured images in a mobile terminal according to one embodiment of the present invention.

FIG. 21 is a diagram for another example of providing an IA service based on a plurality of captured images in a mobile terminal according to one embodiment of the present invention.

In particular, FIG. 21 shows one embodiment of providing a user with specific information based on a plurality of captured images and location information.

First of all, referring to a 1$^{st}$ diagram of 'September 19, 2015 (2015/09/19)' shown in FIG. 21, a mobile terminal activates an IA in response to a trigger signal 2111 and is able to activate a camera in response to a preset input signal 2112 in the IA activated state. Moreover, while the IA and the camera are activated during 'September 19, 2015 (2015/09/19)', the mobile terminal can capture a plurality of images. In doing so, the mobile terminal can save a location information of a place at which the image is captured. Moreover, the mobile terminal may save time information of a timing point of capturing the image.

Moreover, referring to a 1$^{st}$ diagram of 'September 20, 2015 (2015/09/20)' shown in FIG. 21, a mobile terminal activates an IA in response to a trigger signal 2121 and is able to activate a camera in response to a preset input signal 2122 in the IA activated state. Moreover, while the IA and the camera are activated during 'September 20, 2015 (2015/09/20)', the mobile terminal can capture a plurality of images. In doing so, the mobile terminal can save location information of a place at which the image is captured. Moreover, the mobile terminal may save time information of a timing point of capturing the image.

On the other hand, in case that each image captured timing point lies in a preset time range, it is able to capture an image without separate IA and camera activating signals after capturing an image [not shown in FIG. 21]. Yet, if each image captured timing point exceeds the preset time range, since an IA and a camera may be deactivated, activations of the IA and camera may be required before capturing each image.

In this case, as shown in a last drawing of FIG. 21, the mobile terminal can determine or decide user's intent from a plurality of the captured images. According to the embodiment shown in FIG. 21, the user's intent may correspond to recording restaurants visited in the course of touring a specific area. Moreover, the mobile terminal can provide IA information based on time content information related to an image captured time and location context information related to an image captured place as well as on the image context information extracted from a plurality of the captured images. Hence, the mobile terminal can output a map indicating a specific area in a manner of marking a place and date corresponding to a captured image on the map as IA information 2130.

Figure 22:
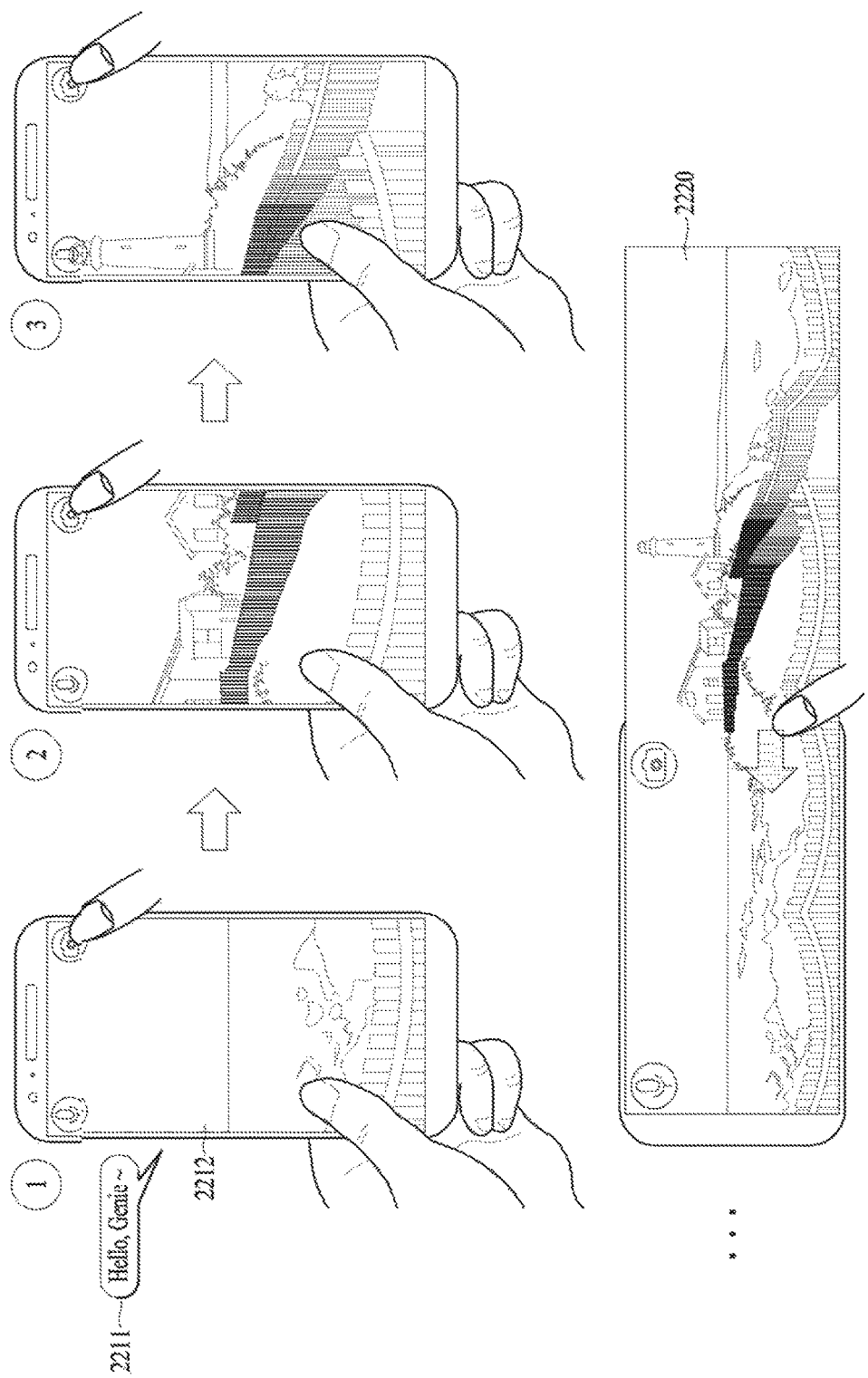
FIG. 22 is a diagram for one example of providing an IA service based on a plurality of captured images in a mobile terminal according to one embodiment of the present invention.

FIG. 22 is a diagram for one example of providing an IA service based on a plurality of captured images in a mobile terminal according to one embodiment of the present invention.

In particular, FIG. 22 shows one embodiment of providing a panoramic image based on a plurality of captured images and location information.

First of all, referring to a $1^{st}$ diagram shown in FIG. 22, the mobile terminal activates an IA in response to a trigger signal 2211 and is able to activate the camera in response to a preset input signal 2212 in the IA activated state.

Moreover, referring to FIG. 22, while the IA and camera are activated, a plurality of images can be captured. In this case, a plurality of the images may correspond to images for a plurality of areas located in front of the mobile terminal. In particular, a user can consecutively capture images by rotating an angle little by little in a specific direction using the mobile terminal. After a plurality of the images have been captured, the mobile terminal can obtain and determine user's intent from a plurality of the captured images. According to the embodiment shown in FIG. 22, the user's intent may correspond to taking a panoramic image including an image in a different direction as well as an image in a user shot direction. Hence, based on the captured images, the mobile terminal extracts an image corresponding to location information of a captured image from the server and is then able to provide the panoramic image as IA information 2220.

Figure 23:
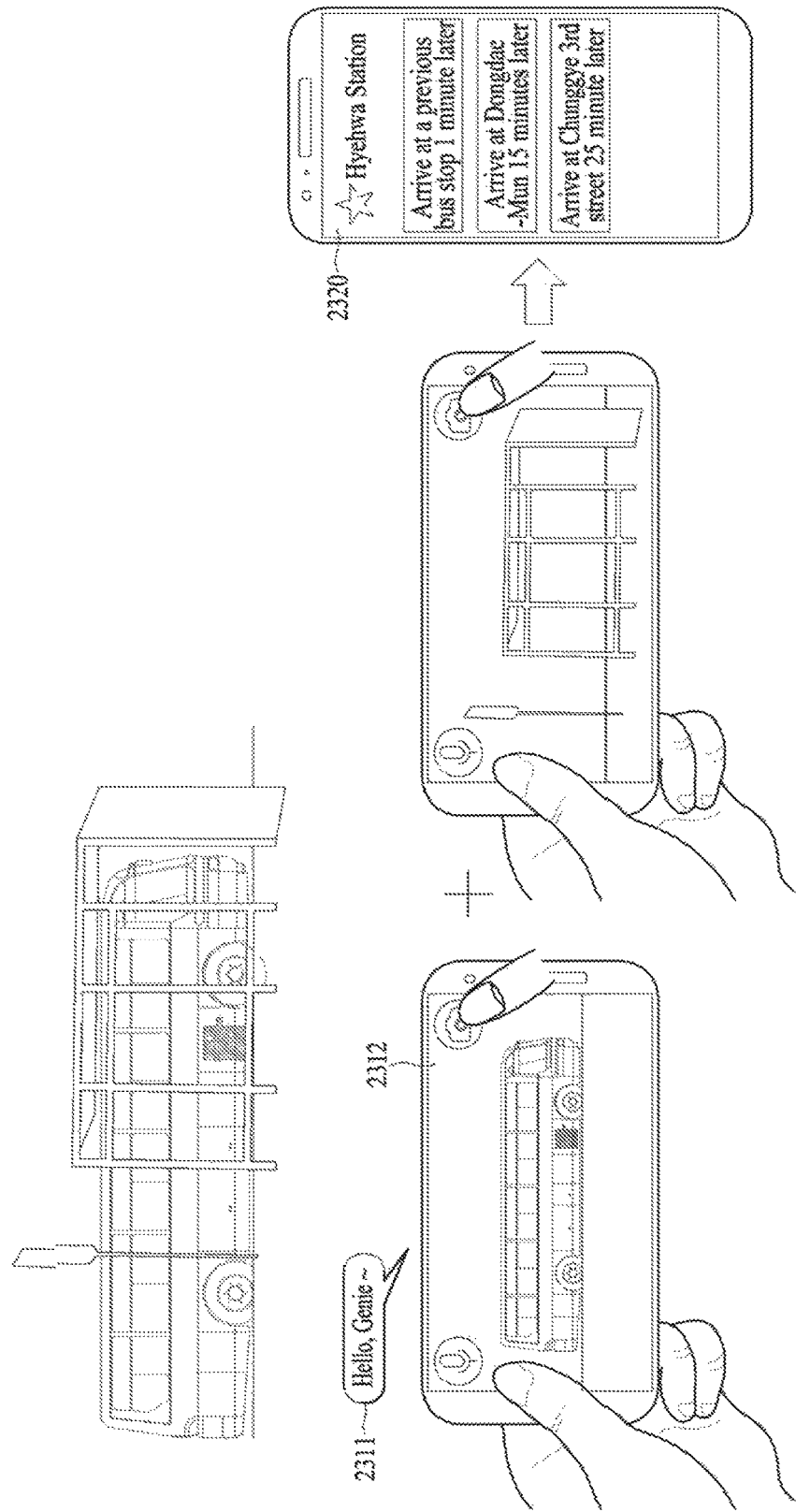
FIG. 23 is a diagram for one example of providing an IA service based on a plurality of captured images in a mobile terminal according to one embodiment of the present invention.

FIG. 23 is a diagram for one example of providing an IA service based on a plurality of captured images in a mobile terminal according to one embodiment of the present invention.

In particular, FIG. 23 shows one embodiment of providing a user with IA information based on a plurality of captured images and location information corresponding to a plurality of the images.

First of all, referring to a $1^{st}$ diagram shown in FIG. 23, the mobile terminal activates an IA in response to a trigger signal 2311 and is able to activate the camera in response to a preset input signal 2312 in the IA activated state. According to the embodiment shown in FIG. 23, the mobile terminal may be located at a place near a bus stop.

Referring to the $1^{st}$ diagram shown in FIG. 23, when a bus is sensed within a view angle area of the activated camera, the mobile terminal can sense an input signal for capturing a bus image. Subsequently, referring to a $2^{nd}$ diagram shown in FIG. 23, when a bus stop is sensed within the view angle area of the activated camera, the mobile terminal can sense an input signal for capturing an image of the bus stop. In doing so, the image capturing order can be reversed. Moreover, the mobile terminal can sense location information of the bus stop as location information [not shown in FIG. 23].

In this case, the mobile terminal can obtain or determine user's intent based on a plurality of the captured image and the locations information corresponding to a plurality of the images. In particular, the mobile terminal extracts image context information from a plurality of the captured images, extracts location context information from the location information of the mobile terminal, and is able to provide IA information based on the image context information and the location context information. According to the embodiment shown in FIG. 23, the user's intent may correspond to intending to know a time at which the bus included in the bus image is located at the bus stop. Hence, the mobile terminal can output a bus time of arriving at the corresponding bus stop on the display unit as IA information 2320.

<Providing IA Service Based on Plurality of Screen Shot Images>

According to the following embodiments described with reference to FIG. 24 and FIG. 25, an IA service is provided in a mobile terminal based on a screen shot image of a content outputted to a display unit. According to the embodiments shown in FIG. 24 and FIG. 25, the screen shot image is assumed as captured in response to an input signal for a soft key or a hardware key provided to the mobile terminal while a content is displayed on the display unit.

Figure 24:
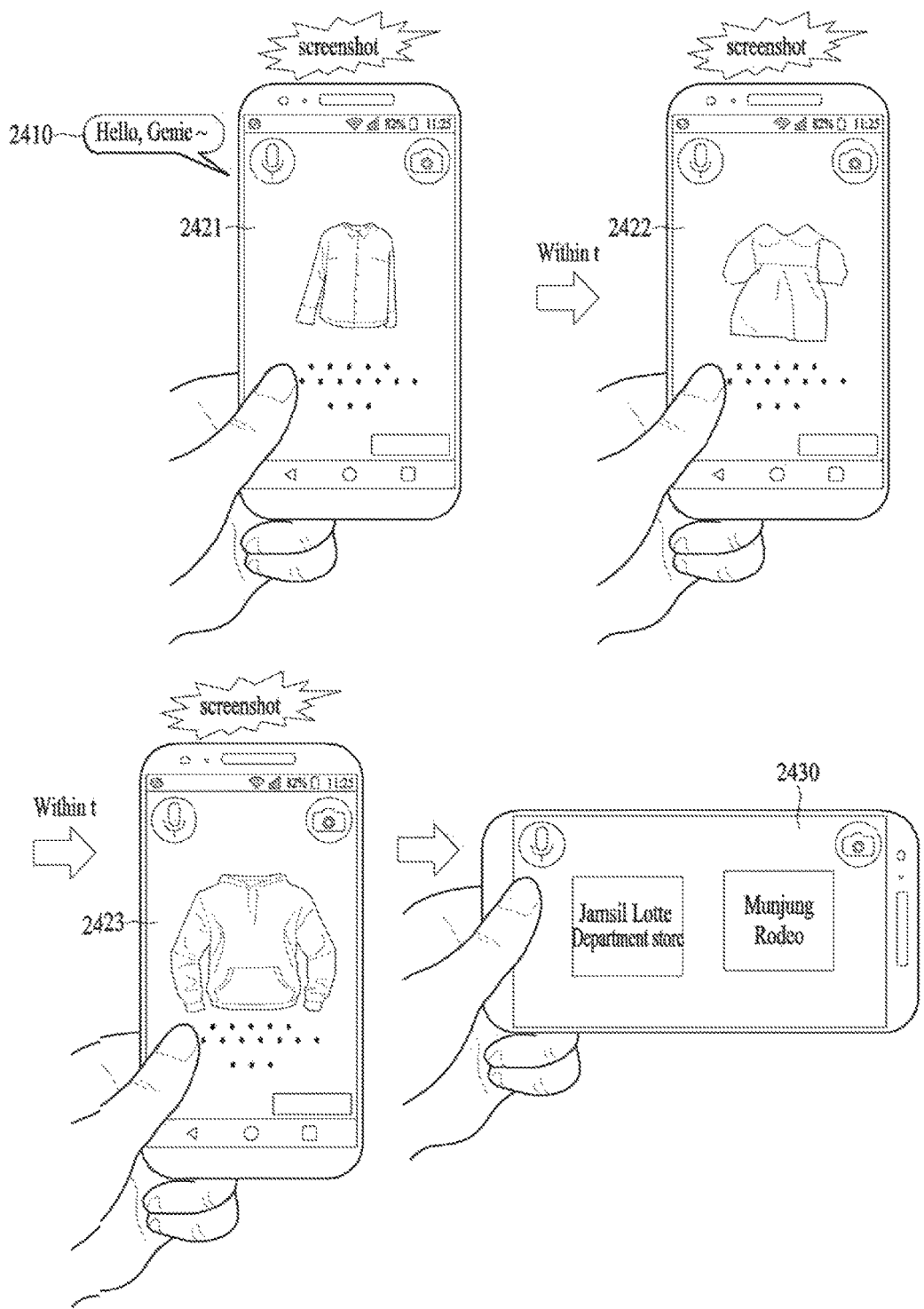
FIG. 24 is a diagram for one example of providing an IA service based on a plurality of screen shot images in a mobile terminal according to one embodiment of the present invention.

First of all, FIG. 24 is a diagram for one example of providing an IA service based on a plurality of screen shot images in a mobile terminal according to one embodiment of the present invention.

In particular, FIG. 24 shows a case that a user is provided with an IA service in the course of searching an on-line shopping mall for street clothes.

Referring to a $1^{st}$ diagram shown in FIG. 24, the mobile terminal can activate an IA in response to a trigger signal 2410. Moreover, the embodiment shown in FIG. 24 corresponds to a case that an IA service is provided based not on an image sensed or captured through the camera but on a screen shot image of a content displayed on the display unit. Hence, the embodiment shown in FIG. 24 is assumed as unrelated to activation or deactivation of the camera.

Subsequently, referring to the $1^{st}$ diagram shown in FIG. 24, while the IA is activated, the mobile terminal can save a $1^{st}$ screen shot image of a content outputted to the display unit. In particular, the mobile terminal can capture and save a screen shot of a content outputted to the display unit in response to an input signal for a soft or hardware key [not shown in FIG. 24]. In the $1^{st}$ diagram of FIG. 24, the $1^{st}$ screen shot image 2421 corresponds to a street clothes image. The mobile terminal can save a $2^{nd}$ screen shot image 2422 within a preset time t from a timing point of capturing the $1^{st}$ screen shot image 2421. Referring to a $2^{nd}$ diagram shown in FIG. 24, the $2^{nd}$ screen shot image 2422 may correspond to a street clothes image different from that of the $1^{st}$ screen shot image 2421.

Moreover, the mobile terminal can save a $3^{rd}$ screen shot image 2423 within a preset time t from a timing point of capturing the $2^{nd}$ screen shot image 2422. Referring to a $3^{rd}$ diagram shown in FIG. 24, the $3^{rd}$ screen shot image 2423 may correspond to a street clothes image different from that of the $1^{st}$ screen shot image 2421 or the $2^{nd}$ screen shot image 2422.

Meanwhile, as an additional screen shot image is not captured within a preset time t from a timing point of sensing the $3^{rd}$ screen shot image 2423, the preset time may expire. In this case, the mobile terminal can obtain or determine user's intent based on the $1^{st}$ to $3^{rd}$ screen shot images 2421 to 2423. According to the embodiment shown in FIG. 24, the user's intent may correspond to the intent to purchase clothes by virtually wearing favorite clothes on an online shopping mall. Hence, the mobile terminal can output IA information 2430, which is based on the $1^{st}$ to $3^{rd}$ screen shot images 2421 to 2423, to the display unit. Referring to a $4^{th}$ diagram shown in FIG. 24, the mobile terminal can output an information on offline shops at which a user can try the street clothes included in the $1^{st}$ to $3^{rd}$ screen shot images 2421 to 2423.

Figure 25:
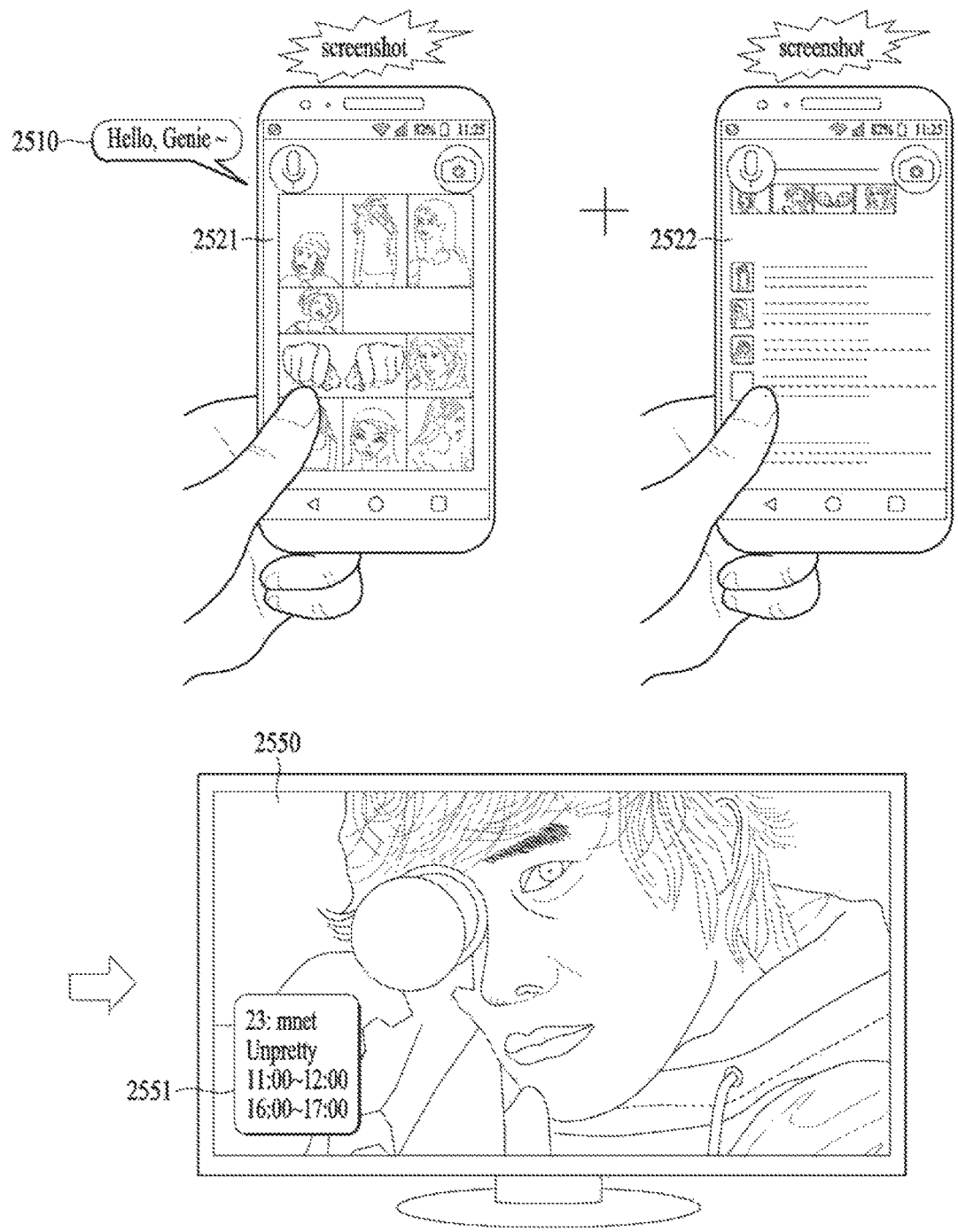
FIG. 25 is a diagram for one example of providing an IA service based on a plurality of screen shot images in a mobile terminal according to one embodiment of the present invention.

FIG. 25 is a diagram for one example of providing an IA service based on a plurality of screen shot images in a mobile terminal according to one embodiment of the present invention.

In particular, while a mobile terminal and an external device are paired with each other, FIG. 25 shows a case of providing IA information to the external device based on a plurality of screen shot images captured from the mobile terminal. Moreover, the embodiment shown in FIG. 25 corresponds to a case that an IA service for a screen shot image of a content related to a specific television broadcast is provided.

According to the embodiment shown in FIG. 25, assume that the mobile terminal and an external device 2550 are paired with each other. In case of performing the pairing, as the mobile terminal and the external device 2550 perform a communication access, thereby enabling data transmission and reception interactively. The pairing can be performed by Bluetooth, NFC and the like. The external device 2550 may include various digital devices having display units. For instance, the external device 2550 shown in FIG. 25 may correspond to a television.

Referring to a $1^{st}$ diagram shown in FIG. 25, the mobile terminal can activate an IA in response to a trigger signal 2510. Moreover, as mentioned in the foregoing description with reference to FIG. 24, the embodiment shown in FIG. 24 corresponds to a case that an IA service is provided based on a screen shot image. Hence, the embodiment shown in FIG. 25 is assumed as unrelated to activation or deactivation of the camera.

Subsequently, referring to the $1^{st}$ diagram shown in FIG. 25, while the IA is activated, the mobile terminal can save a $1^{st}$ screen shot image 2521 of a content outputted to the display unit. In doing so, since the saving of the $1^{st}$ screen shot image 2521 is as good as mentioned in the foregoing description with reference to FIG. 24, its description shall be omitted. According to the embodiment shown in FIG. 25, the $1^{st}$ screen shot image 2521 may correspond to an image related to a $1^{st}$ broadcast program.

Moreover, the mobile terminal can save a $2^{nd}$ screen shot image 2522 within a preset time from a timing point of capturing the $1^{st}$ screen shot image 2521. Referring to a $2^{nd}$ diagram shown in FIG. 25, the $2^{nd}$ screen shot image 2522 may correspond to a different image related to the $1^{st}$ program of the $1^{st}$ screen shot image 2521.

Meanwhile, when a preset time expires from a timing point of sensing the $2^{nd}$ screen shot image 2522, the external device 2550 may be in a state of outputting a $2^{nd}$ program to the display unit.

For instance, the mobile terminal can send IA information 2551 related to the $1^{st}$ program to the external device 2550. Moreover, the external device 2550 receives the IA information 2551 from the mobile terminal and is able to simultaneously output the IA information in the course of outputting a content of the $2^{nd}$ program.

For another instance, the external device 2550 may include the same IA of the mobile terminal. And, a status of a user of the mobile terminal may be authenticated as a user of the external device 2550. In this case, the external device 2550 receives IA information from the server and is able to output the IA information 2551 to the display unit.

<Providing IA Service Based on Combination of Screen Shot Image and Capture Image>

Figure 26:
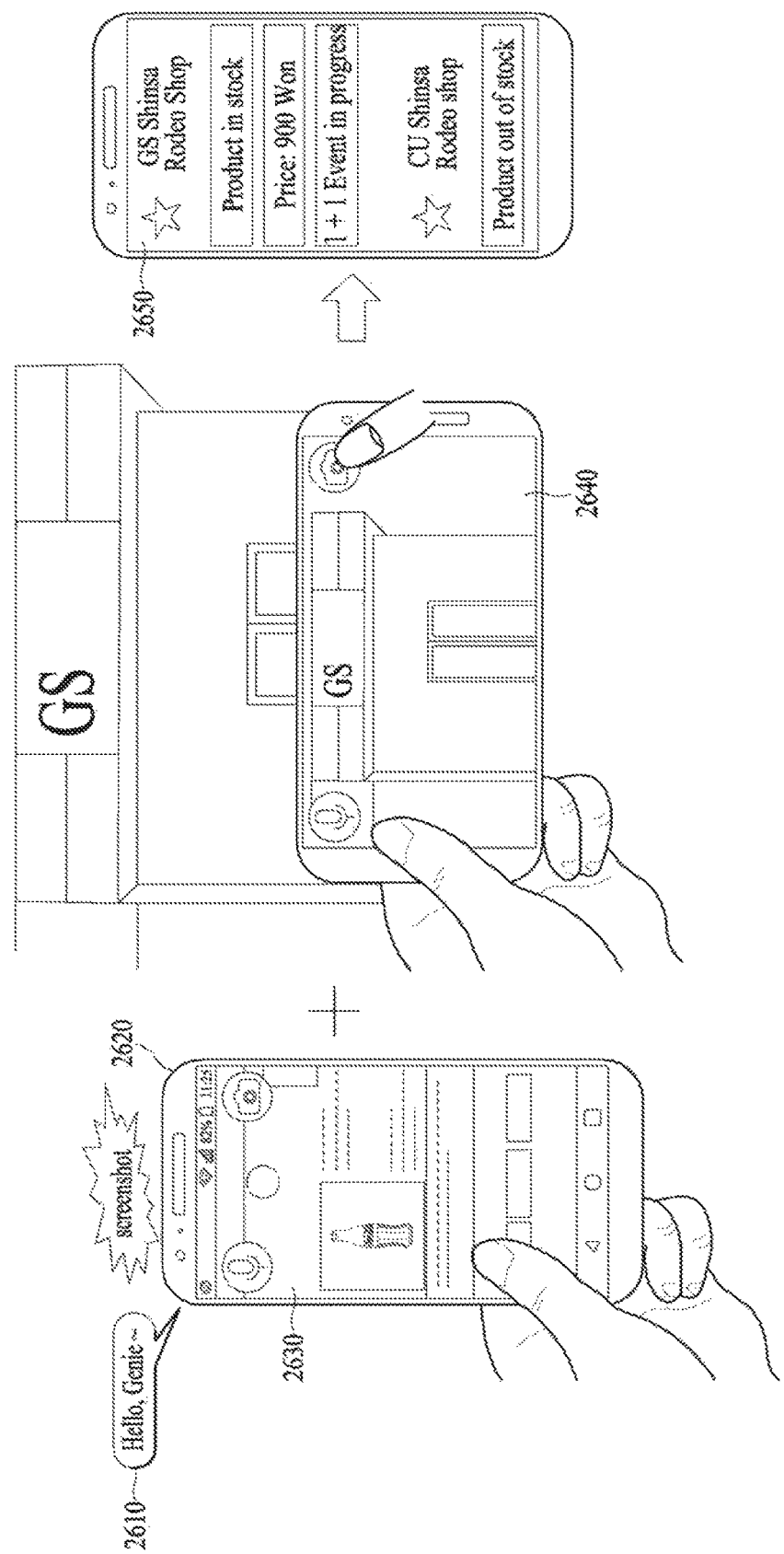
FIG. 26 is a diagram for one example of providing an IA service based on a screen shot image and a captured image in a mobile terminal according to one embodiment of the present invention.

FIG. 26 is a diagram for one example of providing an IA service based on a screen shot image and a captured image in a mobile terminal according to one embodiment of the present invention.

First of all, referring to a $1^{st}$ diagram shown in FIG. 26, the mobile terminal activates an IA in response to a trigger signal 2610 and is able to activate the camera in response to a preset input signal 2620 in the IA activated state. According to the embodiment shown in FIG. 26, the mobile terminal may be located at a place near a convenience store.

Referring to a $1^{st}$ diagram shown in FIG. 26, the mobile terminal can save a screen shot image 2630 of a content outputted to the display unit. For instance, according to the embodiment shown in FIG. 26, the mobile terminal can capture an image of a specific drink online. Moreover, within a preset time from a timing point of capturing the screen shot image 2630, the mobile terminal can capture an image through the camera provided to the rear side. For instance, the image 2640 captured in the $2^{nd}$ embodiment of the present invention may correspond to an image of a convenience store located near the mobile terminal.

Meanwhile, although the screen shot image 2630 is captured ahead of the captured image 2640 according to the description with reference to FIG. 26, a reverse case is possible. Moreover, if a preset time expires from the timing point of capturing the screen shot image 2630, the IA and the camera may be deactivated. In this case, after the IA and the camera have been activated in response to a trigger signal and a preset input signal again, respectively, if an image is captured, the above-described embodiment can be identically performed again.

In this case, the mobile terminal can obtain or determine user's intent based on the screen shot image 2630 and the captured image 2640. Moreover, the mobile terminal can obtain or determine user's intent based not only on the screen shot image 2630 and the captured image 2640 but also on location information of the mobile terminal [not shown in FIG. 26]. According to the embodiment shown in FIG. 26, the user's intent may correspond to intending to know whether a drink included in the screen shot image 2630 is currently for sale at the convenience store included in the drink captured image 2640. Hence, the mobile terminal can output information, which indicates a presence or non-presence of sales of a specific drink at the corresponding convenience store, to the display unit as IA information 2650. Moreover, the mobile terminal can also provide such information as a presence or non-presence of a discount event of the specific drink, a price of the specific drink and the like as the IA information 2650.

<Providing IA Service Based on User's Heart Rate Information & Captured Image>

Figure 27:
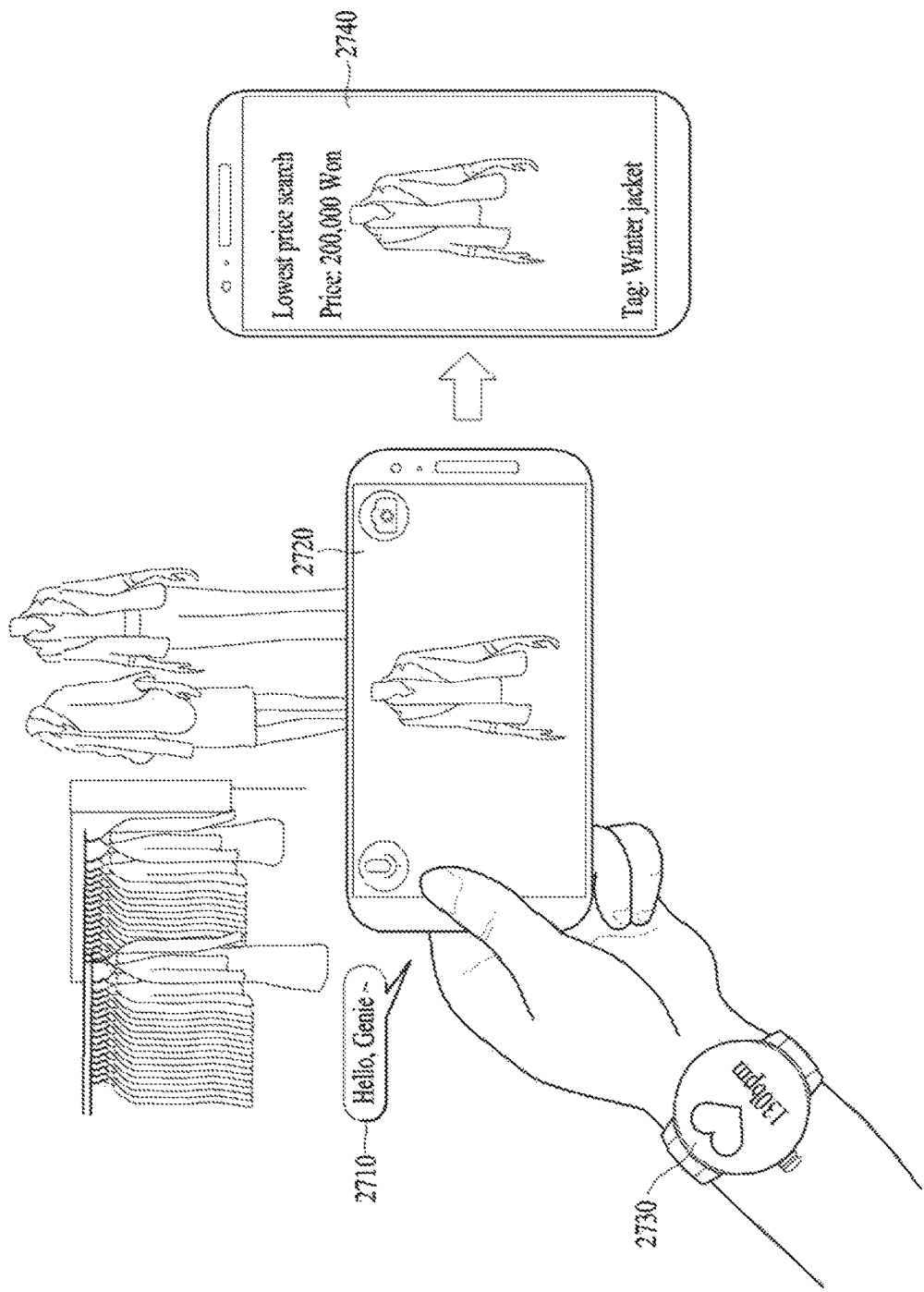
FIG. 27 is a diagram for one example of providing an IA service based on a captured image and user's heart rate sensed by a watch type mobile terminal in a mobile terminal according to one embodiment of the present invention.

FIG. 27 is a diagram for one example of providing an IA service based on a captured image and user's heart rate sensed by a watch type mobile terminal in a mobile terminal according to one embodiment of the present invention.

According to the embodiment shown in FIG. 27, assume that the mobile terminal is currently paired with a mobile terminal 2730 of a watch type. Yet, although the mobile terminal and the watch type mobile terminal 2730 are not currently paired with each other, the present embodiment may be available. In this case, assume that the watch type mobile terminal 2730 includes an IA and that a user authentication is performed by the same used of the mobile terminal.

First of all, referring to a $1^{st}$ diagram shown in FIG. 27, the mobile terminal activates an IA in response to a trigger signal 2710 and is able to activate the camera in response to a preset input signal 2720 in the IA activated state.

Referring to the $1^{st}$ diagram shown in FIG. 27, the watch type mobile terminal 2730 can sense user's heart rate. And, the watch type mobile terminal 2730 can send the sensed heart rate information to the server as user context information. Meanwhile, the mobile terminal can capture an image by the camera provided to its rear side. According to the embodiment shown in FIG. 27, the mobile terminal can capture an image of a one-piece dress for sale at a department store. In this case, the captured image may be extracted as image context information.

In doing so, the IA of the mobile terminal can receive the user's heart rate sensed by the watch type mobile terminal 2730 from the server as an additional context information. Moreover, the mobile terminal can determine or decide user's intent based on the additional context information and the captured image. Moreover, the IA may be able to determine or decide user's intent based not only on the user's heart rate and the captured image but also on at least one location information of a heart rate sensed location and a location of the captured image [not shown in FIG. 27]. According to the embodiment shown in FIG. 27, the user's intent may correspond to intending to purchase a one-piece dress for sale at the department store based on a rapid rise of the heart rate on looking at a jacket. Hence, the IA searches for information on the jacket desired to purchase by the user and is then able to provide the found information as the IA information. For instance, according to the embodiment shown in FIG. 27, the mobile terminal can output information on an online shopping mall, at which the jacket can be purchased at a lowest price, to the display unit as IA information 2740. Moreover, the mobile terminal can output 'winter jacket', which corresponds to tag information additionally searchable by a user, to the display unit as the IA information.

Through the embodiment described with reference to FIG. 27, a user can be provided with information matching user's intent in consideration of information sensed by an external device as well as user's information sensed by a mobile terminal.

Figure 28:
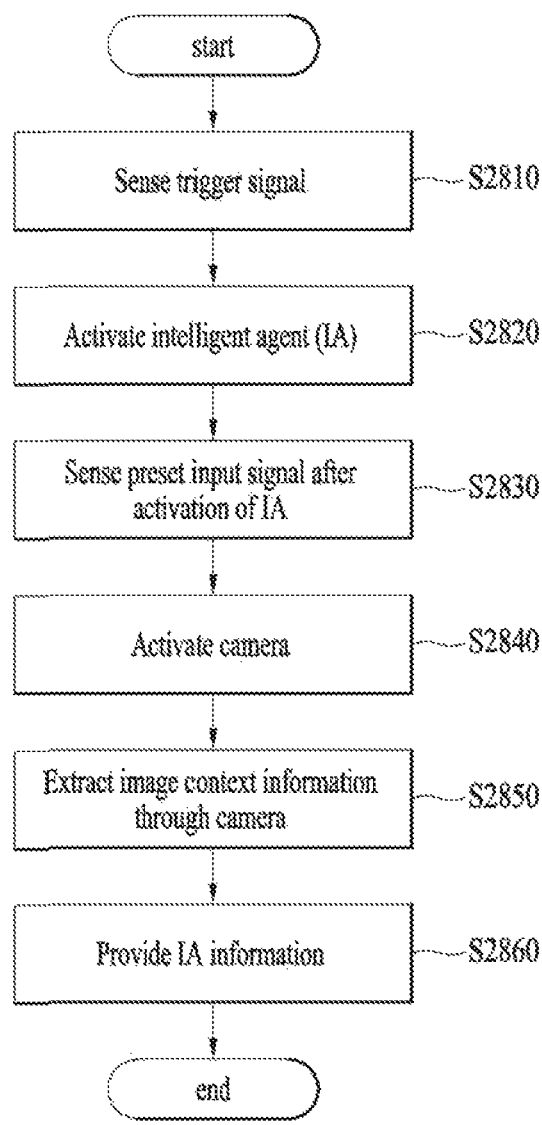
FIG. 28 is a flowchart of a method of controlling a mobile terminal according to one embodiment of the present invention.

FIG. 28 is a flowchart of a method of controlling a mobile terminal according to one embodiment of the present invention. The respective steps shown in FIG. 28 mentioned in the following description can be controlled by the controller 180 of the mobile terminal shown in FIG. 1A.

Referring to FIG. 28, the mobile terminal can sense a trigger signal [S2810]. As mentioned in the foregoing description with reference to FIG. 11, the trigger signal may correspond to a preset voice signal such as 'hello genie' sensed in the turn-on state of the microphone. Subsequently, the mobile terminal can activate the intelligent agent (IA) in response to the trigger signal [S2820].

After the IA has been activated, the mobile terminal can sense a preset input signal [S2830]. As mentioned in the foregoing description with reference to FIG. 11, the preset input signal may correspond to a signal corresponding to a preset motion of the mobile terminal or a signal enabling the mobile terminal to be situated at a preset angle.

In response to the preset input signal, the mobile terminal can activate the camera [S2840]. In this case, as mentioned in the foregoing description with reference to FIG. 11, the mobile terminal can output an image sensed through the camera while an IA related application is currently run.

Subsequently, the mobile terminal can extract image context information of the image sensed through the camera [S2850]. For instance, as mentioned in the foregoing descriptions with reference to FIGS. 15 to 17, the image context information may be extracted from the preview image sensed by the camera. For another instance, as mentioned in the foregoing descriptions with reference to FIG. 18 and FIG. 19, the image context information may be extracted from an image of capturing the preview image sensed by the camera. For further instance, as mentioned in the foregoing descriptions with reference to FIG. 24 and FIG. 25, the image context information can be extracted from the screen shot image of the content outputted to the display unit.

Finally, the mobile terminal can provide IA information based on the image context information [S2860]. Moreover, as mentioned in the foregoing description with reference to FIG. 13, the IA information can be provided in form of visual information or voice information. Moreover, the IA information may include tag information indicating a keyword.

Accordingly, embodiments of the present invention provide various effects and/or features.

According to at least one of embodiments of the present invention, a mobile terminal can provide an IA service further matching user's intent based on image information sensed through the mobile terminal as well as on user's voice information.

According to at least one of embodiments of the present invention, it is able to provide an IA service matching user's intent based on additional information sensed by an external device as well as on user's voice information and image information sensed through a camera.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:
1. A mobile terminal, comprising:
a display;
a camera;
a sensing unit comprising a microphone;
a communication unit configured to communicate with a server; and
a controller configured to:

activate an intelligent agent (IA) in response to a trigger signal, the trigger signal comprising a preset voice signal received via the microphone;
activate the camera in response to a preset input signal sensed in a state that the IA has been activated;
sense at least one object from a preview image recognized within a view angle area of the activated camera or from an image captured via the activated camera; and
receive, via the communication unit, context information associated with the sensed at least one object from the server.

2. The mobile terminal of claim 1, wherein the controller is further configured to:
extract image context information corresponding to the preview image or the captured image;
extract voice context information corresponding to a voice received via the microphone, the voice received within a preset period of time after the trigger signal is sensed; and
provide IA information based on the extracted image context information and voice context information.

3. The mobile terminal of claim 2, wherein the controller is further configured to:
extract location context information from location information of the mobile terminal; and
provide IA information based on the extracted image context information and location context information.

4. The mobile terminal of claim 2, wherein:
the image context information corresponds to at least two preview images sensed within the view angle area of the camera; and
the at least two preview images comprise a first preview image and a second preview image.

5. The mobile terminal of claim 4, wherein the controller is further configured to:
sense the second preview image within a preset period time after sensing the first preview image; and
provide IA information based on the first preview image and the second preview image when a preset period time expires after sensing the second preview image.

6. The mobile terminal of claim 5, wherein the controller is further configured to:
extract location context information from location information of the mobile terminal; and
provide the IA information based on the location context information, the first preview image, and the second preview image.

7. The mobile terminal of claim 2, wherein:
the image context information corresponds to at least two capture images sensed within the view angle area of the camera; and
the at least two capture images comprise a first capture image and a second capture image.

8. The mobile terminal of claim 7, wherein the controller is further configured to:
extract location context information from location information of the mobile terminal; and
provide IA information based on the location context information, the first capture image, and the second capture image.

9. The mobile terminal of claim 2, wherein the image context information comprises at least one capture image sensed from the preview image within the view angle area of the camera and at least one screen shot image for content displayed via the display.

10. The mobile terminal of claim 9, wherein context information of a user is stored in the server and the controller is further configured to:
cause the communication unit to receive additional context information of the user sensed by an external device; and
provide IA information based on the received additional context information and the image context information.

11. The mobile terminal of claim 2, wherein the IA information is provided as at least one of visual information or voice information.

12. The mobile terminal of claim 2, wherein the IA information comprises tag information indicating a keyword included in the image context information or the voice context information.

13. The mobile terminal of claim 1, wherein while the IA has been activated, the controller is further configured to:
extract image context information corresponding to at least one screen shot image for content displayed via the display; and
provide IA information based on the extracted image context information.

14. The mobile terminal of claim 13, wherein the controller is further configured to cause the communication unit to transmit the IA information to the server when an IA of an external device for which user authentication is activated.

15. The mobile terminal of claim 1, wherein the controller is further configured to:
execute an IA related application when the IA is activated; and
cause the display to display a preview image sensed in a view angle area of the camera via the IA related application when the camera is activated.

16. A method for controlling a mobile terminal, the method comprising:
sensing, via a sensing unit, a trigger signal, the trigger signal comprising a preset voice signal received via a microphone of the mobile terminal;
activating, via a controller, an intelligent agent (IA) in response to the sensed trigger signal;
sensing, via the sensing unit, a preset input signal in a state that the IA has been activated;
activating, via the controller, a camera of the mobile terminal in response to the preset input signal;
sensing, via the controller, at least one object from a preview image recognized within a view angle area of the activated camera or from an image captured via the activated camera; and
receiving, via a communication unit, context information associated with the sensed at least one object from a server.

17. The method of claim 16, further comprising:
extracting image context information corresponding to the preview image or the captured image;
extracting voice context information corresponding to a voice received via the microphone within a preset period of time after the trigger signal is sensed; and
providing IA information based on the extracted image context information and voice context information.

18. The method of claim 17, further comprising:
extracting location context information from location information of the mobile terminal; and
providing IA information based on the extracted image context information and location context information.

19. A mobile terminal, comprising:
a display;
a camera;

a sensing unit comprising a microphone;
a communication unit configured to communicate with a server; and
a controller configured to:
- activate an intelligent agent (IA) and the camera in response to a trigger signal and a preset input signal, respectively, the trigger signal comprising a preset voice signal received via the microphone;
- cause the display to display an indicator indicating the activation of the intelligent agent;
- sense at least one object from a preview image recognized within a view angle area of the activated camera or an image captured via the activated camera; and
- receive, via the communication unit, context information associated with the sensed at least one object from the server.

* * * * *